(12) United States Patent
Wiley et al.

(10) Patent No.: US 10,927,044 B2
(45) Date of Patent: Feb. 23, 2021

(54) BORON CARBIDE BASED MATERIALS AND PROCESS FOR THE FABRICATION THEREOF

(71) Applicants: Charles Schenck Wiley, Charlotte, NC (US); Robert F. Speyer, Atlanta, GA (US)

(72) Inventors: Charles Schenck Wiley, Charlotte, NC (US); Robert F. Speyer, Atlanta, GA (US)

(73) Assignee: VECRO MATERIALS LLC, Atlanta, GA (US)

(*) Notice: Subject to any disclaimer, the term of this patent is extended or adjusted under 35 U.S.C. 154(b) by 527 days.

(21) Appl. No.: 15/827,320

(22) Filed: Nov. 30, 2017

(65) Prior Publication Data
US 2018/0170814 A1      Jun. 21, 2018

Related U.S. Application Data

(62) Division of application No. 13/976,724, filed as application No. PCT/US2011/067618 on Dec. 28, 2011, now Pat. No. 9,890,087.

(Continued)

(51) Int. Cl.
*C04B 35/626*      (2006.01)
*C04B 35/563*      (2006.01)
(Continued)

(52) U.S. Cl.
CPC ............ *C04B 35/563* (2013.01); *C04B 33/32* (2013.01); *C04B 35/62655* (2013.01);
(Continued)

(58) Field of Classification Search
CPC . C04B 35/563; C04B 33/32; C04B 35/62655; C04B 35/62695;
(Continued)

(56) References Cited

U.S. PATENT DOCUMENTS 3,922,474 A * 11/1975 Brown ................... C04B 35/563
                                                               428/457
3,925,575 A    12/1975 Church
(Continued)

FOREIGN PATENT DOCUMENTS

KR    2003-0054077    7/2003
WO    WO 2012/170069    12/2012

OTHER PUBLICATIONS

International Search Report dated Aug. 17, 2012 issued in corresponding International patent application No. PCT/US2011/067618.

(Continued)

*Primary Examiner* — Nahida Sultana
(74) *Attorney, Agent, or Firm* — Ostrolenk Faber LLP

(57) ABSTRACT

Disclosed is a method for fabricating a solid article from a boron carbide powder comprising boron carbide particles that are coated with a titanium compound. Further disclosed herein are the unique advantages of the combined use of titanium and graphite additives in the form of water soluble species to improve intimacy of mixing in the green state. The carbon facilitates sintering, whose concentration is then attenuated in the process of forming very hard, finely dispersed $TiB_2$ phases. The further recognition of the merits of a narrow particle size distribution $B_4C$ powder and the use of sintering soak temperatures at the threshold of close porosity which achieve post-HIPed microstructures with average grain sizes approaching the original median particle size. The combination of interdependent factors has led to $B_4C$-based articles of higher hardness than previously reported.

5 Claims, 33 Drawing Sheets

Related U.S. Application Data

(60) Provisional application No. 61/427,707, filed on Dec. 28, 2010.

(51) Int. Cl.

| | | |
|---|---|---|
| *C04B 35/628* | (2006.01) | |
| *C04B 35/632* | (2006.01) | |
| *C04B 35/634* | (2006.01) | |
| *C04B 35/645* | (2006.01) | |
| *C04B 33/32* | (2006.01) | |

(52) U.S. Cl.
CPC .. *C04B 35/62695* (2013.01); *C04B 35/62821* (2013.01); *C04B 35/6325* (2013.01); *C04B 35/63476* (2013.01); *C04B 35/6455* (2013.01); C04B 2235/3813 (2013.01); C04B 2235/3821 (2013.01); C04B 2235/3826 (2013.01); C04B 2235/422 (2013.01); C04B 2235/425 (2013.01); C04B 2235/449 (2013.01); C04B 2235/48 (2013.01); C04B 2235/5409 (2013.01); C04B 2235/5445 (2013.01); C04B 2235/5481 (2013.01); C04B 2235/656 (2013.01); C04B 2235/6562 (2013.01); C04B 2235/6565 (2013.01); C04B 2235/661 (2013.01); C04B 2235/668 (2013.01); C04B 2235/77 (2013.01); C04B 2235/784 (2013.01); C04B 2235/785 (2013.01); C04B 2235/786 (2013.01); C04B 2235/80 (2013.01); C04B 2235/96 (2013.01)

(58) Field of Classification Search
CPC .......... C04B 35/62821; C04B 35/6325; C04B 35/63476; C04B 35/6455; C04B 2235/3813; C04B 2235/3821; C04B 2235/3826; C04B 2235/422; C04B 2235/425; C04B 2235/449; C04B 2235/48; C04B 2235/5409; C04B 2235/5445; C04B 2235/5481; C04B 2235/656; C04B 2235/6562; C04B 2235/6565; C04B 2235/661; C04B 2235/668; C04B 2235/77; C04B 2235/784; C04B 2235/785; C04B 2235/786; C04B 2235/80; C04B 2235/96

See application file for complete search history.

(56) References Cited

U.S. PATENT DOCUMENTS

| 4,327,186 | A | 4/1982 | Murata et al. |
|---|---|---|---|
| 4,753,903 | A | 6/1988 | Saito |
| 4,777,152 | A | 10/1988 | Tsukada |
| 4,957,884 | A | 9/1990 | Knudsen et al. |
| 5,021,368 | A | 6/1991 | Hoffman et al. |
| 5,032,242 | A | 7/1991 | Knudsen et al. |
| 5,108,962 | A | 4/1992 | Khazai et al. |
| 5,227,345 | A | 7/1993 | Howard et al. |
| 5,342,811 | A | 8/1994 | Khazai et al. |
| 5,516,588 | A | 5/1996 | van den Berg |
| 5,543,370 | A | 8/1996 | Sigl et al. |
| 5,656,563 | A | 8/1997 | Chen et al. |
| 5,976,429 | A | 11/1999 | Chen et al. |
| 6,613,383 | B1 | 9/2003 | George |
| 7,442,661 | B2 | 10/2008 | Hirao et al. |
| 7,867,471 | B2 | 1/2011 | Wilson |
| 8,128,861 | B1 | 3/2012 | Aghajanian et al. |
| 8,357,623 | B2 | 1/2013 | Lillo et al. |
| 2005/0014010 | A1 | 1/2005 | Dumm |
| 2008/0006145 | A1* | 1/2008 | Park .............. F41H 5/0435 |
| | | | 89/36.01 |
| 2008/0115424 | A1 | 5/2008 | Can et al. |
| 2009/0250850 | A1 | 10/2009 | Wilson |
| 2010/0028193 | A1* | 2/2010 | Haynes, III ........... C22C 32/00 |
| | | | 419/19 |
| 2010/0248930 | A1 | 9/2010 | Lillo et al. |
| 2010/0285947 | A1 | 11/2010 | Weir et al. |
| 2011/0028301 | A1 | 2/2011 | Vargas-Gonzalez et al. |
| 2011/0227259 | A1 | 9/2011 | Pujari et al. |
| 2013/0075669 | A1* | 3/2013 | Landwehr ............ H01B 1/122 |
| | | | 252/504 |
| 2013/0157835 | A1 | 6/2013 | Sekine |
| 2019/0022745 | A1* | 1/2019 | Scott ................... B22F 3/12 |
| 2019/0093991 | A1* | 3/2019 | Cryer .................. B32B 7/022 |

OTHER PUBLICATIONS

Prochazka and R. M. Scanlan, "Effect of Boron and Carbon on Sintering of Silicon Carbide," J. Am. Ceram. Soc., 58 [1-2] 72 (1975).

D. R. Lide, Ed., CRC Handbook of Chemistry and Physics, 81st Ed., CRC Press, Boca Raton, FL, p. 12-211-12-212, 2000-2001.

L. Vargas-Gonzalez, R.F. Speyer and J. Campbell, "Flexural Strength, Fracture Toughness, and Hardness of Silicon Carbide and Boron Carbide Armor Ceramics," Int. J. of Appl. Ceram. Tech., 7 [5] 643-651 (2010).

Korean Office Action dated Oct. 14, 2014 issued in Korean Application No. 10-2013-7019394 (with English translation).

J. H. She and K. Ueno, "Densification Behavior and Mechanical Properties of Pressureless-Sintered Silicon Carbide Ceramics with Alumina and Yttria Additions," Mater. Chem. Phys., 59 139-142 (1999).

ASTM International, Standard Test Method for Vickers Indentation Hardness of Advanced Ceramics. Annual Book of ASTM Standards ASTM C1327-08, ASTM International, West Conshohocken, PA, 2007.

ASTM International, Standard Test Method for Knoop Indentation Hardness of Advanced Ceramics. Annual Book of ASTM Standards ASTM C1326-03, ASTM International, West Conshohocken, PA, 2007.

Niihara, A. Nakahira, and T. Hirai "The Effect of Stoichiometry on Mechanical Properties of Boron Carbide" J. Amer. Ceram. Soc., 67 [1] C13-C14 (1984).

Japan Office Action dated Nov. 4, 2014 issued in corresponding Japanese Patent Application No. 2013-547650 (with an English translation).

Hayashi, Shinsuke et al., "$TiB_2$-$B_4C$ Composites Pressureless-Sintered Using Ni and C as Densification Aids", Journal of the Ceramic Society of Japan, vol. 101, pp. 154-158 (1993).

Office Action dated Feb. 2, 2015 issued in U.S. Appl. No. 13/955,898.

Supplementary Partial European Search Report dated Jan. 27, 2015.

B.-S. Lee et al. "Low-temperature processing of B4C-Al composites via infiltration technique," Materials Chemistry and Physics 67:249-255 (2001).

H. Abdizadeh et al., "Investigation of Addition of B4C Particles Coated by Nano-TiB2 on Microstructure and Mechanical Behavior of Al-B4C Composites" International Conference on Smart Materials and Nanotechnology in Engineering, vol. 6423 (2007).

Japanese Office Action dated Jun. 22, 2015 issued in Japanese Application No. 2013-547650 with English translation.

European Extended Search Report dated Aug. 6, 2015 issued in European Application No. 11867200.5.

* cited by examiner

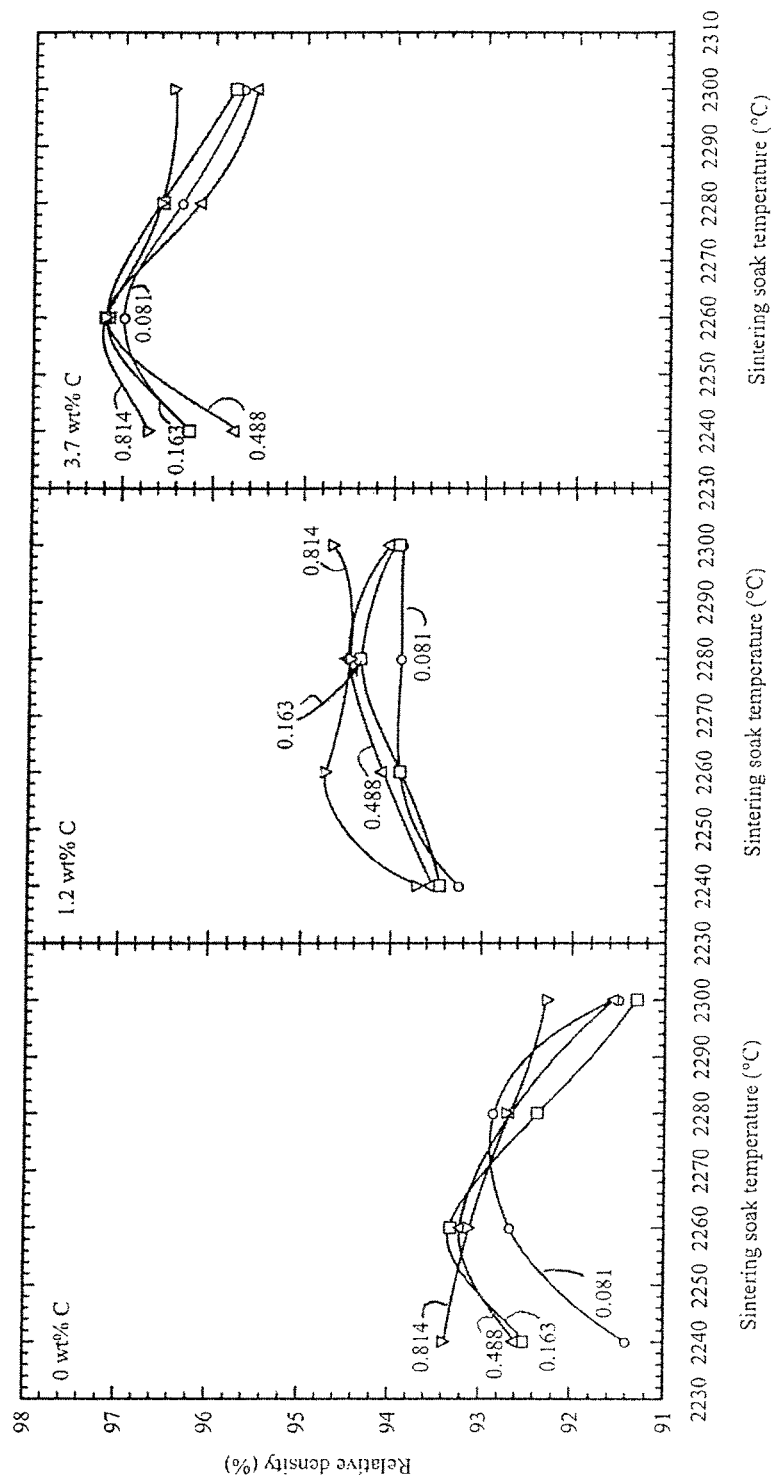

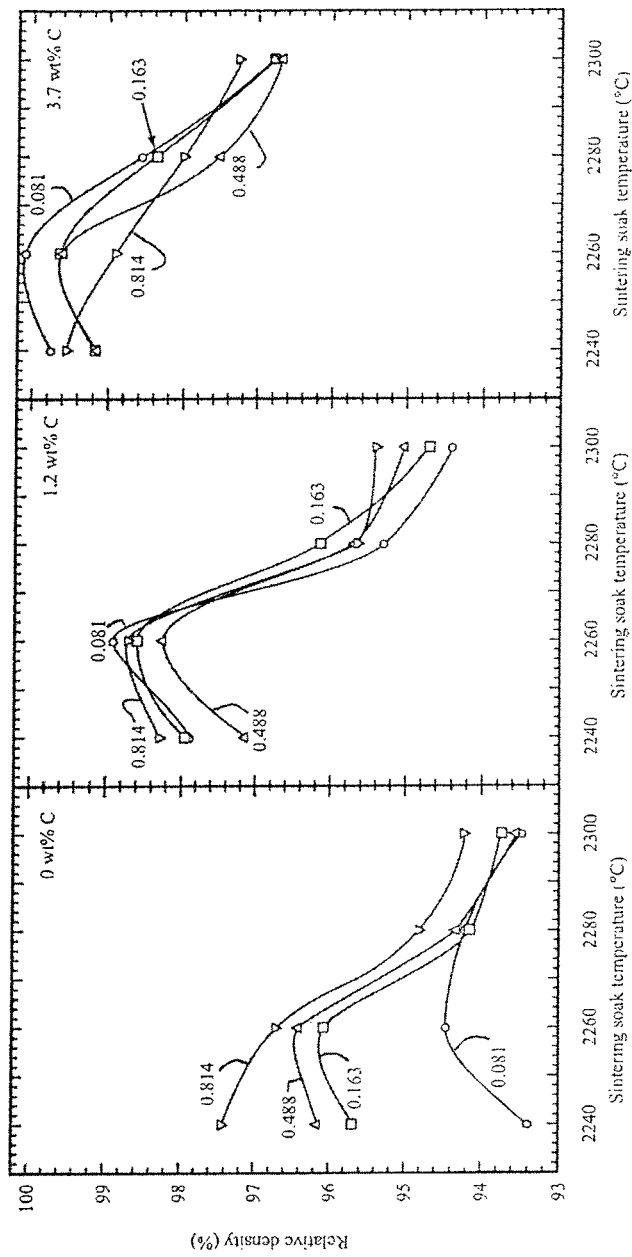

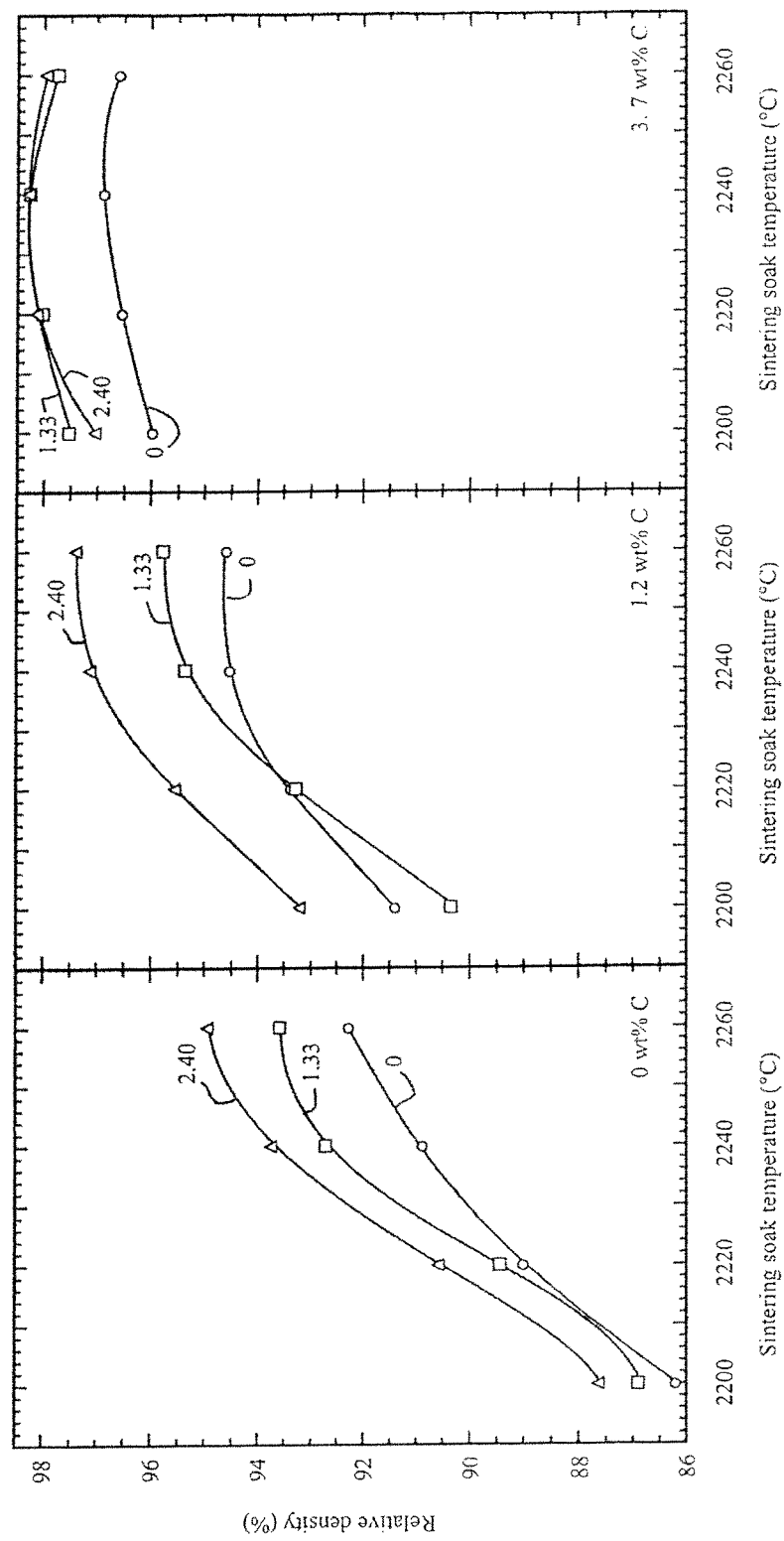

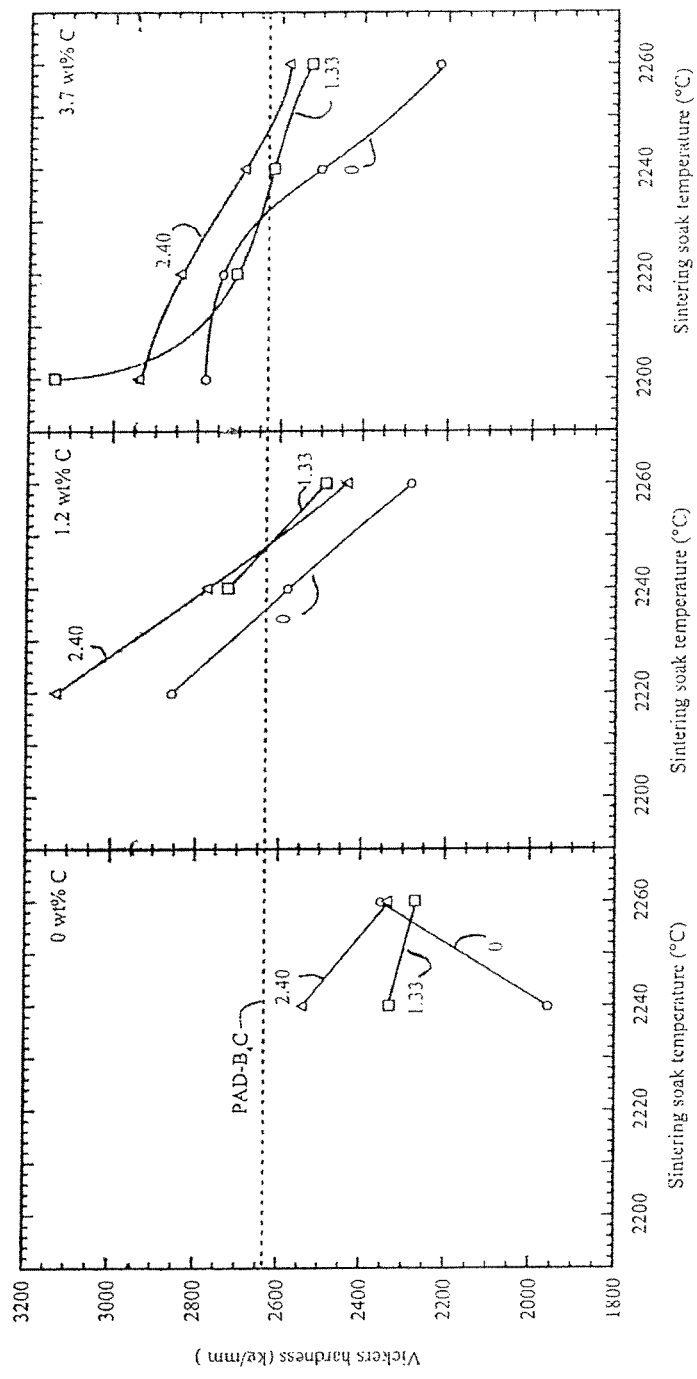

a b

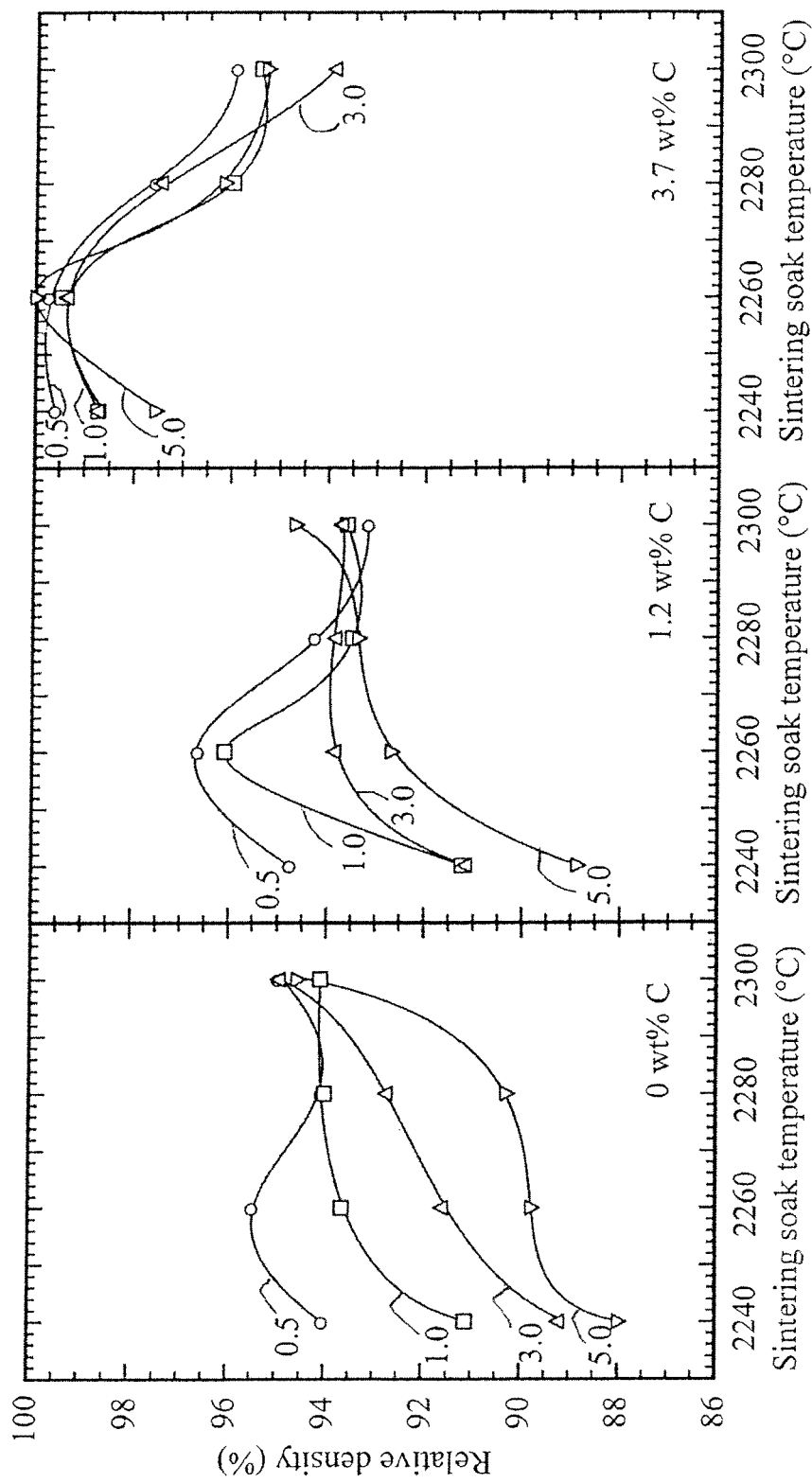

BORON CARBIDE BASED MATERIALS AND PROCESS FOR THE FABRICATION THEREOF

CROSS-REFERENCE TO RELATED APPLICATIONS

The present application is a divisional under 37 C.F.R. § 1.53(b) of prior U.S. patent application Ser. No. 13/976,724, filed Aug. 27, 2013, which in turn is a 35 U.S.C. § 371 National Phase conversion of PCT/US2011/067618, filed Dec. 28, 2011, which claims priority of U.S. Provisional Patent Application No. 61/427,707, filed Dec. 28, 2010. The contents of each of these applications are incorporated in full by reference herein.

FIELD OF INVENTION

The present invention relates to a boron carbon-based material and a process for the synthesis of the material.

Definition

Weight percent or wt % as used herein is referring to the relative proportion of a constituent in a mixture of only the constituent and boron carbide (not the weight percentage of the constituent in a mass containing boron carbide, the constituent and other constituents). Thus, wt % Ti or titanium, for example, is referring to the percentage of the titanium in titanium and the boron carbide mass.

BACKGROUND

Boron carbide ($B_4C$) is the third hardest known material behind diamond and the hardest known material which is thermodynamically stable at ambient pressures. High hardness combined with low weight (theoretical density: 2.52 $g/cm^3$) have made boron carbide a preferred material of the strike face for personal armor systems to stop, for example, armor piercing bullets. Such armor is typically manufactured by hot-pressing, which involves uniaxially pressing boron carbide powder in graphite performs with graphite dies at elevated temperatures. While this process produces densified ceramic bodies of adequately low porosity to properly function as armor, hot pressed boron carbide is only economically feasible for the fabrication of simple shapes, which can nest one above the other so that a stack of parts can be simultaneously hot-pressed.

In a recently issued patent, Speyer et al. (U.S. Pat. No. 7,517,491) showed that high purity sinter-grade (median particle size, $d_{50}$=0.8 μm) boron carbide could be pressurelessly sintered to a closed porosity state in part by extracting the boron oxide layer on particles in the pressed compact. Such articles could then benefit from the densification action of hot isostatic pressing (HIPing). These articles reached near theoretical density after HIPing, suffered no shape restriction because of the method of processing, and yielded hardnesses higher than any other reported for boron carbide. The boron carbide powder used by Speyer et al. was high purity, sub micron ($d_{50}$=0.8 μm), with a broad particle size distribution which facilitated high green relative densities (65-70%).

Pressureless sintering a boron carbide compact that includes a sintering promoter such as carbon is well known. It is also well known that the compact can include titanium compounds such as titania which is introduced into the compact in powder form prior to forming the compact. See C. S. Wiley, Ph. D. Thesis, *Synergistic Methods for the Production of High Strength and Low Cost Boron Carbide*, Georgia Institute of Technology, Published December 2011.

BRIEF DESCRIPTION OF THE INVENTION

A process according to the present invention can be employed for the fabrication of high hardness solid articles that are suitable, for example, for the strike face of an armor. A process according to the present invention uses a boron carbide powder comprising boron carbide particles that are coated with a titanium compound, which are formed into green bodies, pressureless sintered and HIPed to obtain high relative density and high hardness solid articles that include at least a boron carbide phase and a titanium diboride phase. Furthermore, a carbon containing compound can be added to the coatings according to the present invention to obtain solid articles with unique and advantageous properties. As discussed in great detail below, the addition of carbon facilitates sintering, while the formation of titanium diboride attenuates the concentration of carbon to obtain a microstructure that includes very hard, finely dispersed $TiB_2$ phases. Furthermore, it is shown herein that using a narrow particle size distribution $B_4C$ powder and the use of pressureless sintering soak temperatures at the threshold of closed porosity achieves post-HIPed microstructures with average grain sizes approaching the original median particle size of the starting boron carbide powder.

A process according to the present invention includes a step for processing a boron carbide based powder, forming a green body from the powder, applying thermolysis and pyrolysis steps to the green body, pressureless sintering of the green body to obtain a body sintered to a closed-porosity state, cooling the pressureless sintered body, and hot isostatic pressing (HIPing) of the cooled pressureless-sintered body.

According to one aspect of the present invention, powder processing includes forming a preferably aqueous slurry from a combination of a boron carbide powder, a water soluble organometallic source for titanium (e.g. dihydroxybis (ammonium lactate) titanium (IV), $C_6H_{10}O_8Ti.2(NH_4)$), and, in some embodiments, a water soluble carbon source (e.g. a water soluble phenolic resin). The slurry is then spray dried to obtain a boron carbide based granulated powder composition, comprised of boron carbide particles that are coated with a titanium compound and, in embodiments that use a carbon source, a carbon containing compound.

According to another aspect of the present invention, the boron carbide powder can have a narrow particle size distribution. In some cases, the narrow particle size may allow for reduction in the cost of starting materials. In addition, narrow particle size distribution can retard grain growth. In the preferred embodiments, the median particles size of the boron carbide powder may be less than 1 μm.

According to yet another aspect of the present invention, the boron carbide-based powder is mixed with a suitable water-soluble binder as part of the spray drying slurry. After spray drying, uniaxial and isostatic pressing, the green body is then heated to attain the thermolysis of the binder, the pyrolysis of the carbon source, and the decomposition of the dihydroxybis (ammonium lactate) titanium (IV)) to leave a simplified titanium-bearing residue, postulated to be titania. Thereafter, the thermolized and pyrolized green body is subjected to pressureless sintering to obtain a pressureless sintered body, the pressureless sintering step optionally including an intermediate thermal step to ensure volatilization of boron oxide coatings of the boron carbide particles in the powder. The pressureless sintered body is then cooled, and the cooled pressureless sintered body is HIPed.

According to yet another aspect of the present invention, a post-HIPed body is obtained which includes boron carbide, and titanium diboride. The body so obtained is suitable for applications requiring high hardness, for example, armor. Furthermore, a body so obtained can have a median grain size distribution approaching a value less than one micron, i.e. closely approaching the median size distribution of the starting boron carbide powder.

A process according to the preferred embodiment of the present invention uses a boron carbide powder with a narrow particle size distribution as part of a methodology to produce a body having no porosity and small (sub-micron) average grain size, resulting in Vickers hardness values higher than values previously obtained for boron carbide bodies made with a boron carbide powder of wider particle size distributions and no added impurities. In the preferred embodiment, carbon additions in the form of water-soluble phenolic resin, and titanium additions in the form of dihydroxybis (ammonium lactato) titanium (IV), introduced in the pre-spray drying aqueous suspension, facilitate intimate coating of the additives on the boron carbide particles in spray dried granules. After thermolysis/pyrolysis heat-treatment of uni-axially and cold isostatically pressed bodies made with the coated boron carbide particles (powder composition), graphite and titanium-containing phases (postulated to be a $B_2O_3$—$TiO_2$ eutectic liquid) coat the $B_4C$ particles of the green compact. During sintering heat-treatment, the graphite is interpreted to have reacted away boron oxide coatings on the $B_4C$ particles, facilitating a lower temperature onset of sintering, along with functioning as a sintering aid and grain growth inhibitor at higher temperatures. At these higher temperatures, the titanium-bearing phase reacts with graphite and boron carbide to form titanium diboride, depleting the concentration of free graphite in the sintered and post-HIPed body. The extent of grain growth is attenuated by the combination of 1) starting with powder of narrow particle size distribution, 2) the presence of the added impurities, pinning grain boundary movement, and 3) the use of the lowest sintering soak temperatures which sinter the body to a closed-porosity state (as opposed to sintering to the maximum achievable relative density). The resulting microstructure of samples prepared through a process according to the preferred embodiment yielded higher post-HIPed relative densities, smaller grain size, and lesser graphite grain coarsening. The combination of the two additives, intimately mixed with $B_4C$ powder, allows the use of graphite additions which facilitate densification, but whose (hardness-reducing) concentration is attenuated in the latter stages of sintering through the process of forming a very hard $TiB_2$ phase. Thus, a process for fabricating a ceramic body according to the present invention includes preparing a powder composition that includes boron carbide particles coated with a titanium compound; forming a green body from the powder composition; and pressureless sintering the green body to obtain a sintered boron carbide body having closed porosity. The powder composition is prepared by preparing a slurry from the boron carbide particles and a titanium containing solution, and spray drying the slurry. The slurry is preferably water-based but can be prepared with any suitable solvent. The titanium containing solution includes an organometallic titanium compound that is capable of adhering to the exterior surfaces of the boron carbide particles so that it may coat the particles. A process according to the present invention can produce a solid article that includes boron carbide phases and titanium diboride phases.

Solid articles of higher hardness can be produced by adding a carbon containing compound to the slurry. In the preferred embodiment, the organometallic compound and the carbon containing compound are water soluble and the slurry is prepared by mixing the organometallic compound, the carbon containing compound and the boron carbide particles in water. In the preferred embodiments, the organometallic compound is ammonium lactato titanium (IV) and the carbon containing compound is phenolic resin.

A solid article according to the present invention is formed from a boron carbide powder that includes boron carbide particles of a given median size, the solid article including a sintered body that includes a boron carbide phase and a titanium diboride phase, the phases being present in granular form, wherein the relative density of the sintered body is more than 99% and the hardness of the sintered body is more than 2600 Vickers, and the median grain sizes of the grains of each phase is no more than 100% larger than the median size of the boron carbide particles in the starting powder. The sintered body may further include a carbon-based phase, wherein the carbon-based phase is 0-0.5% of the volume of the sintered body. In the preferred embodiments, the sintered body includes 0.081-5 wt % titanium in the form of $TiB_2$. Also, in the preferred embodiments, up to 50% of grains of the phases are less than 1 μm in diameter, and more preferably up to 40% of grains of said phases are less than 0.5 μm in diameter.

BRIEF DESCRIPTION OF THE FIGURES

FIGS. 2A, 2B and 2C graphically show relative densities of pressureless sintered samples prepared from powder compositions containing 0.081, 0.163, 0.488, 0.814 wt % titanium and 0 wt % carbon (FIG. 2A), 1.2 wt % carbon (FIG. 2B) and 3.7 wt % carbon (FIG. 2C), as a function of sintering soak temperature, determined by the Archimedes method, using the rule of mixtures of as-batched compositions as the basis for theoretical densities. Numbers labeling various traces indicate the weight percentage of titanium (on an as-batched basis).

FIGS. 3A, 3B and 3C graphically show relative densities of pressureless sintered and post-HIPed samples of FIGS. 2A, 2B and 2C respectively as a function of sintering soak temperature (HIP schedule identical for all data). Numbers labeling various traces indicate the weight percentage of titanium (on an as-batched basis).

FIG. 4B) during pressureless sintering heat-treatments.

FIGS. 5A, 5B and 5C graphically show relative densities of pressureless sintered samples prepared from powder compositions containing 0.0, 1.33, 2.40 wt % titanium and 0 wt % carbon (FIG. 3A), 1.2 wt % carbon (FIG. 3B) and 3.7 wt % carbon (FIG. 3C), as a function of sintering soak temperature, determined by the Archimedes method, using the rule of mixtures of as-batched compositions as the basis for theoretical densities. Numbers labeling various traces indicate the weight percentage of titanium (on an as-batched basis).

FIGS. 7A, 7B, and 7C graphically show Vickers hardness values for the HIPed samples of FIGS. 6A, 6B and 6C respectively as a function of pressureless sintering soak temperatures. For comparison, the Vickers hardness of PAD-$B_4C$ (hot-pressed, BAE Systems, 2632.4☐111.7) is shown as a dashed line measured on the same instrument using the same parameters and methodology used for measuring the hardness of the samples.

(FIG. 12A), 2220° C. (FIG. 12B), 2240° C. (FIG. 12C) and 2260° C. (FIG. 12D).

FIGS. 20A, 20B and 20C graphically show relative density values of the samples of FIGS. 19A, 19B and 19C respectively after HIPing, as a function of sintering soak temperature.

DETAILED DESCRIPTION

Figure 1A:
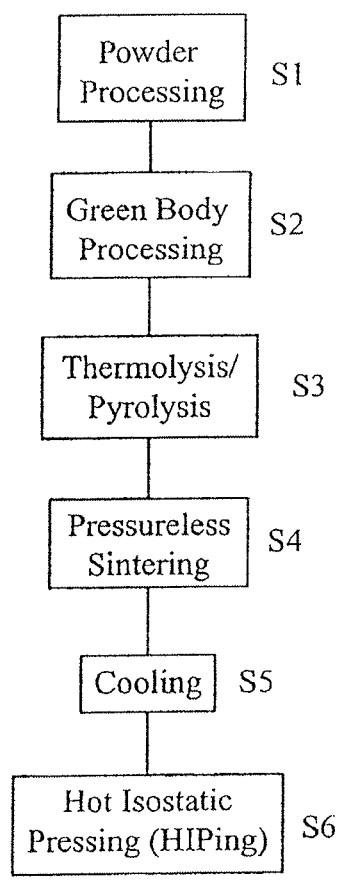
FIG. 1A shows the steps in a process for the fabrication of a boron carbide body according to the present invention.
Figure 1C:
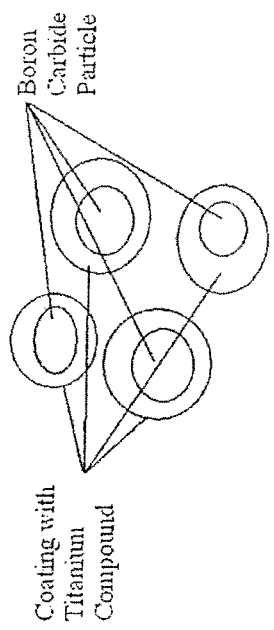
FIG. 1C illustrates a number of boron carbide particles prepared according to the process shown in FIG. 1B, coated with a titanium-containing compound.
Figure 1D:
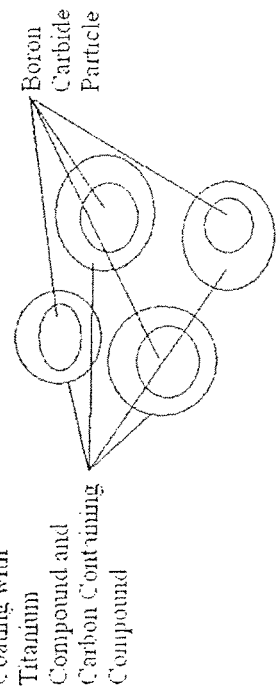
FIG. 1D illustrates a number of boron carbide particles prepared according to the process shown in FIG. 1B coated with a titanium-containing compound and a carbon-containing compound.
Figure 1B:
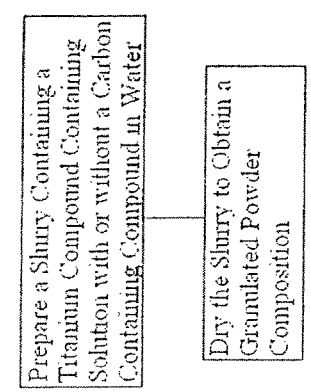
FIG. 1B shows the steps for the preparation of a granulated powder composition according to the present invention.

Referring to FIG. 1A, a process according to the present invention uses a granulated powder composition which is comprised of boron carbide particles coated at least with a titanium compound. Step S1 refers to the process for preparing the granulated powder composition. Referring to FIG. 1B, according to the present invention, the powder composition is prepared by first preparing a slurry that contains at least boron carbide particles and a titanium containing solution that includes a titanium compound capable of adhering to the exterior surfaces of the boron carbide particles after drying. The slurry is then spray dried to obtain a granulated powder composition suitable for forming a compact under pressure. FIG. 1C illustrates a powder composition according to the present invention. As illustrated, a powder composition according to the present invention includes boron carbide particles that are coated at least with a titanium compound. In other embodiments, a carbon containing compound may be added to the slurry before the slurry is spray dried. Preferably, the carbon containing compound is also capable of adhering to the exterior surfaces of the boron carbide particles. Thus, as illustrated in FIG. 1D, the powder composition may include boron carbide particles that are coated with a titanium-containing compound, or a titanium-containing compound and a carbon-containing compound.

Referring to FIG. 1A, a compact (green body) is formed from the granulated powder composition (S1) according to any suitable method (e.g. uniaxial pressing, isopressing, extrusion). The green body is then heated (S3) to cause the thermolysis and/or pyrolysis of the titanium-containing compound and/or carbon-containing compound in the green body. After the thermolysis/pyrolysis step (S3), the green body is pressureless sintered (S4) to obtain a pressureless sintered body having closed porosity (typically, but not always, a closed porosity boron carbide body will have a relative density in the range of 93-96%). The pressureless sintered body is then cooled (S5) and further densified through HIPing (S6).

First Series of Samples with Powder Compositions Having Less than 1 wt % of Titanium The first series of samples, which were prepared according to the process disclosed in FIG. 1A and described above, were boron carbide based bodies that included titanium diboride ($TiB_2$). The starting powder composition for the preparation of samples included less than 1 wt % of titanium and were prepared according to the process disclosed in FIG. 1B and described above. The boron carbide powder used to prepare the first series of samples (and the second series of samples disclosed below) was a high purity boron carbide powder (HD15, H. C. Starck, GmbH, Goslar, Germany) of narrow particle size distribution ($d_{10}$-$d_{90}$=0.2-1.5 µm with a $d_{50}$=0.6 µm). The characteristics of the boron carbide powder used for the preparation of the first and the second series of samples is set forth in Table 1.

TABLE 1

| Boron Carbide Powder Characteristics (HD15) | |
|---|---|
| Specific Surface area ($m^2/g$) | 19 |
| Particle size (µm) | $d_{90}$ = 1.5, $d_{50}$ = 0.6, $d_{10}$ = 0.2 |
| Impurity Content (wt %) | 1.7 O, 0.2 N, 0.09 Si, 0.0 Fe, 0.02 Al |
| Carbon Content (wt %) | 21.8 |
| B:C Ratio | 3.9 |

In each case, to perform powder processing (S1, FIG. 1A) to obtain a granulated powder having coated boron carbide particles, slurries were prepared by mixing in deionized water, batches containing 200 g of boron carbide powder, a water-soluble titanium organometallic-containing solution (titanium source), a water-soluble phenolic resin (the carbon source in samples that included carbon), binder components, and 10 drops of a concentrated defoaming agent (Hercules Inc., Wilmington, Del.) in 2 liter high-density polyethylene (HDPE) mixing jars. The titanium organometallic-containing solution used in each slurry was an aqueous solution (pH 7-8) with 50 wt % of dihydroxybis (ammonium lactato) titanium (IV), $C_6H_{10}O_8Ti.2(NH_4)$ (the titanium compound), synonym: lactic acid titanium chelate ammonium salt (Alfa Aesar, Ward Hill, Mass.). The carbon source (for samples that included carbon) was a water-soluble phenolic resin (SP-6877, SI Group, Schenectady, N.Y.). Experiments showed that the phenolic resin produced 37.63 wt % carbon char following pyrolysis at 1000° C. in flowing Ar. In each slurry, a standard binder system composed of 1 wt % polyvinyl alcohol (PVA), 0.5 wt % polyethylene glycol (PEG) plasticizer, and 1 wt % Darvan 821A dispersant (R.T. Vanderbilt Company, Norwalk, Conn.) was used as a water-soluble slurry additives.

The samples of the first series were prepared based on powder compositions in which the content of the titanium organometallic-containing solution in the slurries were selected to produce a powder composition after drying that included 0.081 wt %, 0.163 wt %, 0.488 wt %, and 0.814 wt % of titanium by weight. Additions of 0.5, 1, 3, and 5 wt % of the organometallic Ti additive correspond to 0.081, 0.163, 0.488, and 0.814 wt % of elemental titanium, respectively (based on molar mass ratio of Ti to the titanium-containing $C_6H_{10}O_8Ti.2(NH_4)$, and assuming complete conversion, i.e. 100% yield). Weight percentages of Ti of 0.081, 0.163, 0.488, and 0.814 translate to weight percentages of $TiB_2$ of 0.12, 0.24, 0.71, and 1.18, respectively in the pressureless sintered sample. For each titanium concentration, carbon concentrations of 0 wt %, 1.2 wt %, and 3.7 wt % were used. Weight percentages were determined on the basis of the weight fraction of the additive relative to weight fraction of boron carbide plus that additive alone. This was done so that for a given additive of, for example, phenolic resin, higher concentrations of the organometallic additive did not alter the concentration of carbon relative to boron carbide. Thus, the powder compositions used for the preparation of the first series of samples included the following amounts (by weight) of titanium, carbon and boron carbide powder from Table 1. Table 2 shows the wt % calculated to be yielded from the residues from the organometallic and phenolic resin after thermolysis/pyrolysis. The binder was not factored into the ratios. The carbon formed will be partially consumed in a reaction between it, titania, and boron carbide, so the listed titanium content is assumed to be in the final microstructure, but the calculated carbon will be partially consumed and will not be represented in the final microstructure.

TABLE 2

| Calculated Ti Yield from the Organometallic Additive (wt %) | Calculated Carbon Yield from Phenolic Resin (wt %) | Boron Carbide Powder |
| --- | --- | --- |
| 0.081 | 0% | Balance |
| 0.081 | 1.2% | Balance |
| 0.081 | 3.7% | Balance |
| 0.163 | 0% | Balance |
| 0.163 | 1.2% | Balance |
| 0.163 | 3.7% | Balance |
| 0.488 | 0% | Balance |
| 0.488 | 1.2% | Balance |
| 0.488 | 3.7% | Balance |
| 0.814 | 0% | Balance |
| 0.814 | 1.2% | Balance |
| 0.814 | 3.7% | Balance |

To prepare each powder composition shown in Table 2, the solids loading of the slurries were maintained at 17-22 vol %. Slurries were mixed for 24 hours in a ball mill with boron carbide media. The slurries were then spray dried into granulated powder. During operation, the inlet and outlet temperatures of the spray drying chamber were 260-270° C. and 50-70° C., respectively. The spray drying in each case resulted in a powder composition that included spherical granules of boron carbide particles coated with the titanium-containing compound and, in samples that included carbon, coated with the carbon containing compound (resulting from dried soluble phenolic resin).

To prepare a green body (S2, FIG. 1A) from each powder composition, each granulated powder composition was uniaxially pressed into cylindrical disks measuring 12.7 mm in diameter and ~3 mm in height using a tool steel die under 150 MPa of pressure in a hydraulic hand press. All disks were then placed into latex bags, which were subsequently evacuated using a mechanical vacuum pump and the bags were then sealed. The disks in the latex bags were cold isostatically pressed (CIP, American Isostatic Presses, Inc., Columbus, Ohio) in a water/oil mixture at 345 MPa for 2 minutes in order to improve green density and mitigate any particle packing density gradients resulting from the previous uniaxial pressing step. After CIPing, the weight and caliper-measured dimensions of the disks were measured. The samples were then placed in tiered graphite crucibles, which were in turn placed in a laboratory vacuum furnace with tungsten heating elements and interior walls, enclosed in a water-cooled steel housing (BREW, Thermal Technology Inc., Santa Rosa, Calif.). Under continuous mechanical vacuum pumping, the compacts were heated at 0.5° C./min from room temperature to 500° C. The samples were held at 500° C. for seven hours to thermolyze the binder. They were then heated at 3° C./min to 1350° C., and held at that temperature for four hours in order to pyrolyze the phenolic resin, decompose the titanium compound to leave a titanium-containing residue, and allow these constituents to react as set forth below. The weight of each disk was again measured to determine the weight loss resulting from this heat-treatment.

After the thermolysis/pyrolysis heat-treatment (S3, FIG. 1A) and subsequent cooling, the samples were then pressureless sintered in a laboratory vacuum furnace with graphite heating elements and insulation (Thermal Technology, Santa Rosa, Calif.), and a water-cooled aluminum housing. To pressureless sinter the green samples, the following procedure was followed. Following sample placement, the furnace chamber was evacuated to a pressure of less than 80 mTorr using a mechanical vacuum pump. The furnace was backfilled with He gas to atmospheric pressure, followed by a constant flow rate of this gas of 1 lpm, with the exit gas bubbled through oil. The operational temperature range of the infrared pyrometer used for this furnace was 600-3000° C.; initial heating was based on linearly increasing furnace power until 600° C. was reached, at which point a proportional-integral-derivative temperature control algorithm took over. This linear power increase resulted in an average heating rate of ~63° C./min. After cooling, green samples were heated at 15° C./min from 600° C. to 1300° C. and held at 1300° C. for two hours in order to volatilize any remaining boron oxide coatings on boron carbide particles. The samples were then heated at 15° C./min up to one of the following soak temperatures: 2240° C., 2260° C., 2280° C., and 2300° C. Each sample was held at its respective selected soak temperature for 30 minutes to allow for pressureless sintering. The samples were then cooled at the natural cooling rate of the furnace with the heating elements turned off. An average rate of cooling of ~60° C./min is estimated, based upon the time taken for the furnace to cool from 2300 to 600° C. (though initial cooling is more rapid, while cooling as room temperature is approached is less rapid). Following pressureless sintering, the Archimedes densities of all the samples were measured, and the weight loss resulting from sintering was also recorded.

All of the samples were then HIPed. The HIP was pressurized to 12 kpsi while heating to 450° C. at 15° C./min, and then heated to 1700° C. at 15° C./min while at that pressure. During heating from 1700 to 2050° C., pressure was increased to 30 kpsi, and this pressure and temperature were maintained for a one hour soak. The HIP was then cooled to room temperature with the furnace elements off; when the furnace reached ~150° C., the pressure of the chamber from cooling the gas reduced to ~7.5 kpsi; this pressure was then released to ambient pressure. After HIPing, the Archimedes density was again measured.

The theoretical density values used to calculate the relative densities of the samples were determined using the rule of mixtures based on as-batched compositions:

$$\rho_{composite} = \rho_{B4C} V_{B4C} + \rho_{TiB2} V_{TiB2} + \rho_C V_C$$

where $\rho$ and V represent the theoretical density and volume fraction of each phase ($B_4C$, $TiB_2$, and graphite) in the microstructure, respectively. The theoretical density values used for $B_4C$, $TiB_2$, and graphite were 2.52, 4.50, and 2.16 g/cm$^3$, respectively. Volume fractions were determined from converting masses using, for example, $$V_C = (m_C/\rho_C)/(m_C/\rho_C + m_{B4C}/\rho_{B4C} + m_{TiB2}/\rho_{TiB2})$$

where m is mass of a particular component. The mass of $TiB_2$ was based on equimolar quantities of $TiB_2$ forming from the added Ti.

Second Series of Samples with Powder Compositions Having More than 1 wt % of Titanium A second series of test samples were prepared using powder compositions that included more than 1 wt % of titanium. Specifically, powder compositions were prepared with Ti concentrations of 1.33 wt % and 2.40 wt %—selected as incremental increases over the maximum of 0.814 wt % Ti examined in the first series. Assuming complete conversion of the titanium provided from thermal decomposition of $C_6H_{10}O_8Ti.2(NH_4)$, weight percentages of Ti of 1.33 wt % and 2.40 wt % translate to weight percentages of $TiB_2$ of 1.92 and 3.45, respectively. In preparing the powder compositions for the second series of samples, the same boron carbide powder as the one used for the first series of samples was used. Also, the same water-soluble phenolic resin was used to yield 0, 1.2, and 3.7 wt % C, as well as the other aforementioned organic additives. The samples in this second series were prepared in the same manner as the first series with the exception that thicker green disks of ~9 mm in height (still 12.7 mm diameter) were prepared. Table 3 discloses the contents of the powder composition used to prepare the samples for the second series. Table 3 shows the wt % calculated to be yielded from the residues from the organometallic and phenolic resin after thermolysis/pyrolysis. The binder was not factored into the ratios. The carbon formed will be partially consumed in a reaction between it, titania, and boron carbide, so the listed titanium content is assumed to be in the final microstructure, but the calculated carbon will be partially consumed and will not be represented in the final microstructure.

TABLE 3

| Calculated Ti Yield from the Organometallic Additive (wt %) | Calculated Carbon Yield from Phenolic Resin (wt %) | Boron Carbide Powder |
|---|---|---|
| 0 | 1.2 | Balance |
| 0 | 3.7 | Balance |
| 1.33 | 0 | Balance |
| 1.33 | 1.2 | Balance |
| 1.33 | 3.7 | Balance |
| 2.4 | 0 | Balance |
| 2.4 | 1.2 | Balance |
| 2.4 | 3.7 | Balance |

Testing of the Samples

The data reported herein were based on tests performed according to the procedures set forth in this section. To characterize post-HIPed samples for hardness and microstructure, the samples were encapsulated in SpeciFix resin (Struers, Inc., Westlake, Ohio), and the outer graphite-rich surface was ground away using a 220 grit diamond-coated grinding plate, as well as metal-bonded diamond media plates combined with 45, 15, and 9 μm diamond suspensions (Struers Piano, Struers, Inc., Westlake, Ohio, as well as Apex Band Metadi Supreme, Buehler, Lake Bluff, Ill.). Samples were washed with deionized water following each grinding step. After grinding to flat surfaces, the samples were polished on specialized cloths with 9, 3, and 1 μm polycrystalline diamond suspensions (Struers MD, Struers, Inc., Westlake, Ohio, and Texmet and Metadi Supreme, Buehler, Lake Bluff, Ill.). After each polishing step, the samples were washed and placed in an ultrasonicating bath to remove residual diamond particles from the polished surfaces.

Polished surfaces were indented at arbitrary and unbiased microstructural locations using a Vickers diamond indenter (Duramin-2, Struers, Westlake, Ohio, USA) under an applied load of 1 kg for 15 seconds. Hardness measurements were calibrated using the SRM 2831 tungsten carbide standard reference disk (SRM-2831, National Institute for Standards and Technology, Gaithersburg, Md.). The diagonal lengths of ten acceptable indentations (as determined by ASTM C 1327-99 "Standard Test Method for Vickers Indentation Hardness of Advanced Ceramics") were measured and average hardness values, as well as standard deviations (in units of $kg/mm^2$), were calculated.

The disks prepared for hardness were electrolytically etched in order to reveal the location of the grain boundaries. Samples were etched for ~20-30 seconds in dilute aqueous KOH (1 g of KOH in 100 mL of deionized water) using a current of 20 mA at 21 VDC applied through a thin Pt foil cathode. The microstructures of the HIPed samples were examined using optical microscopy (Olympus BX40, Olympus America, Inc., Center Valley, Pa.) and scanning electron microscopy (SEM, Model 1530 SEM, LEO Electron Microscopy, Inc., Oberkochen, Germany). Energy-dispersive X-ray spectroscopy (EDS, Oxford Pentafet Detector, Oxford Instruments, Oxfordshire, UK) was performed during SEM in order to identify the chemical composition of specific microstructural locations.

The optical micrographs were analyzed using the linear intercept quantitative characterization method to determine the cumulative percent finer grain size distribution and median ($d_{50}$) grain size for select samples based upon 50 grain measurements across each of four separate microstructure images for a total of 200 measurements. To analyze microstructures for the area fraction (percentage) of carbon, a Visual Basic 4.0 program was written which read each pixel of a micrograph for its red, green, and blue intensities. For a black and white image, these values are equivalent; a value of zero is black and a value of 255 is white. A cutoff value was designated, e.g. 30, wherein if a pixel was of lower value, it was taken to be a carbon region. These regions were colored in over the micrograph to provide a visual verification of the regions counted. Some adjustments of the cutoff value and the contrast shown in the micrograph (using Adobe Photoshop) were required so that the carbon regions, and no other regions such as grain boundaries, were counted. Once deemed correct, the ratio of carbon pixels to total pixels was calculated to determine the area percent of the microstructure which was graphite.

The phases contained within as-received powder samples as well as polished post-HIPed disk samples were identified by X-ray diffraction (X'Pert PRO Alpha-I, PANalytical, Almelo, The Netherlands), at a 0.084°/s scan speed, a step size of 0.017°, and 2-theta range of 10° to 85°. Soller slits corresponding to 0.04 radians were installed in the incident and diffracted x-ray beam pathways in order to produce scans with minimal background interference relative to the intensities of the diffraction peaks. Additionally, a 10 mm mask was installed in the incident beam pathway, and a 5 mm mask was installed in the diffracted beam pathway.

Results of Testing

Results for the First Series

Archimedes sintered relative density data for all of the samples in the first series are shown in FIGS. 2A-2C, which indicate that relative densities after pressureless sintering increased with increasing carbon content. The highest relative densities were generally obtained with a sintering soak temperature of 2260° C. Clear trends in relative density with increasing Ti content were not apparent, with the exception of 0 wt % C at the lower sintering soak temperatures. Relative densities of the samples in the first series after post-HIPing are shown in FIGS. 3A-3C. For 1.2 wt % C additions, sintering temperatures of 2280° C. and above yielded degraded HiPed relative densities, even when sintered relative densities were not negatively affected. The specimen with 3.7 wt % C and 0.081 wt % Ti, when sintered with a soak temperature of 2260° C., HIPed to theoretical density.

TABLE 4

Hardness of Specimens of Varying C, Ti, and Sintering Soak Temperatures (± values represent standard deviation).

| Sintering Soak Temperature (° C.) | Carbon Content (wt %) | Titanium Content (wt %) | Vickers Hardness (kg/mm²) |
|---|---|---|---|
| 2240 | 0 | 0.081 | 2198.3 ± 621.9 |
| 2240 | 0 | 0.163 | 2481.5 ± 362.2 |
| 2240 | 0 | 0.488 | 2723.6 ± 166.2 |
| 2240 | 0 | 0.814 | 2832.0 ± 115.1 |
| 2240 | 1.2 | 0.081 | 2179.7 ± 262.3 |
| 2240 | 1.2 | 0.163 | 2750.3 ± 140.9 |
| 2240 | 1.2 | 0.488 | 2774.2 ± 171.0 |
| 2240 | 1.2 | 0.814 | 2861.8 ± 223.8 |
| 2240 | 3.7 | 0.081 | 2569.2 ± 184.8 |
| 2240 | 3.7 | 0.163 | 2912.3 ± 79.61 |
| 2240 | 3.7 | 0.488 | 2993.3 ± 79.0 |
| 2240 | 3.7 | 0.814 | 3027.8 ± 65.8 |
| 2260 | 0 | 0.081 | 2247.0 ± 503.6 |
| 2260 | 0 | 0.163 | 2633.8 ± 225.6 |
| 2260 | 0 | 0.488 | 2668.5 ± 314.7 |
| 2260 | 0 | 0.814 | 2786.5 ± 159.5 |
| 2260 | 1.2 | 0.081 | 2781.5 ± 141.8 |
| 2260 | 1.2 | 0.163 | 2726.5 ± 138.0 |
| 2260 | 1.2 | 0.488 | 2729.9 ± 156.6 |
| 2260 | 1.2 | 0.814 | 2921.3 ± 136.0 |
| 2260 | 3.7 | 0.081 | 2720.0 ± 101.0 |
| 2260 | 3.7 | 0.163 | 2700.8 ± 137.9 |
| 2260 | 3.7 | 0.488 | 2682.9 ± 129.1 |
| 2260 | 3.7 | 0.814 | 2742.5 ± 98.7 |

Figures 4A, 4B:
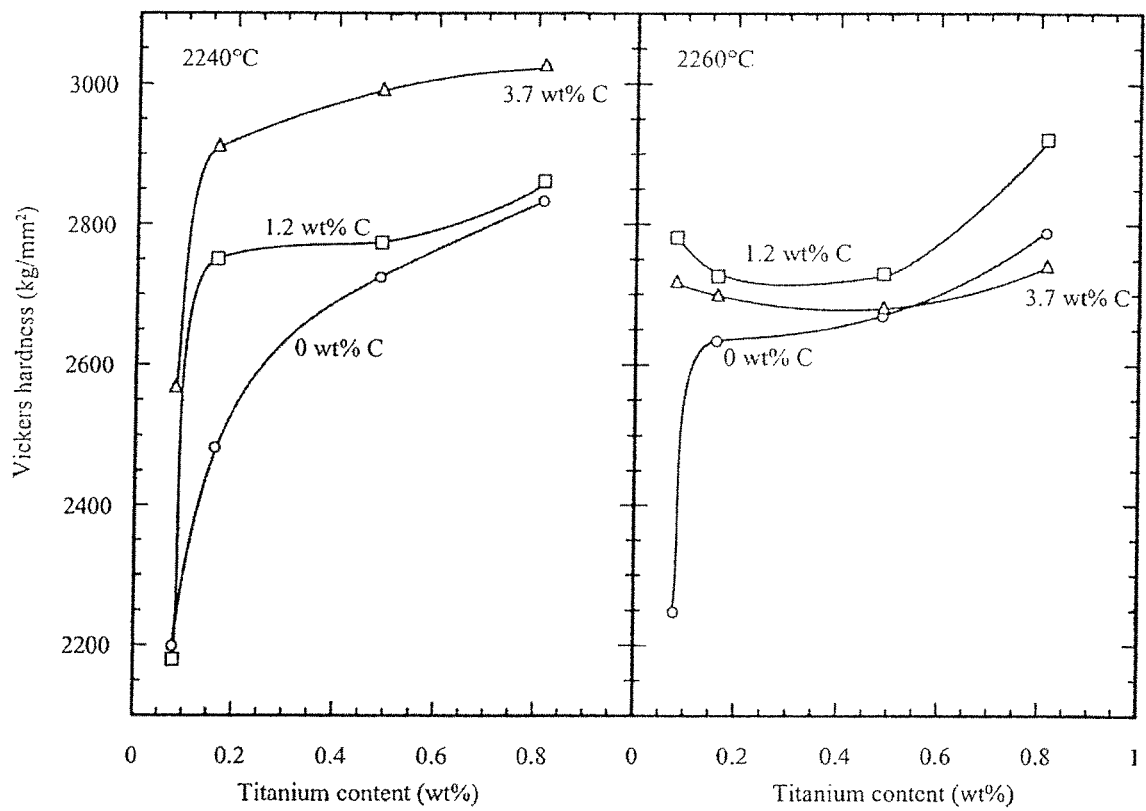
FIGS. 4A and 4B graphically show hardness values of HIPed samples which were exposed to the two lowest pressureless sintering soak temperatures (2240° C., FIG. 4A, 2260° C.

Hardness values after HIPing for the first series samples are shown in Table 4 and FIGS. 4A and 4B. Note that Table 4 identifies each sample based on the powder composition used for the preparation of the sample and a calculated yield of titanium and carbon. Since the relative densities of samples sintered at higher soak temperatures (i.e. 2280° C. and 2300° C.) were low, hardnesses of those specimens were not measured. Specimens with 3.7 wt % C exposed to 2240° C. soaking temperatures achieved markedly higher hardnesses for any given Ti concentration than those exposed to the higher sintering soaking temperatures of 2260° C., even though the latter specimens were generally (i.e. with the exception of the specimen with 0.814 wt % Ti) of higher post-HIPed relative density. For specimens soaked at 2240° C. during sintering heat-treatments, increasing titanium content resulted in increasing hardness for all three (0, 1.2, 3.7 wt %) carbon contents. At 2240° C., for a given Ti content, higher carbon concentrations yielded higher hardness values. This was not the case for the 2260° C. soaking temperature in which 3.7 wt % C additions were of lower hardness than 1.2 wt % C additions. Thus, for the first series, the highest hardness was obtained with the highest carbon and titanium contents, and the lowest sintering soak temperature (i.e. at 2240° C.).

Results for the Second Series

Figures 6A, 6B, 6C:
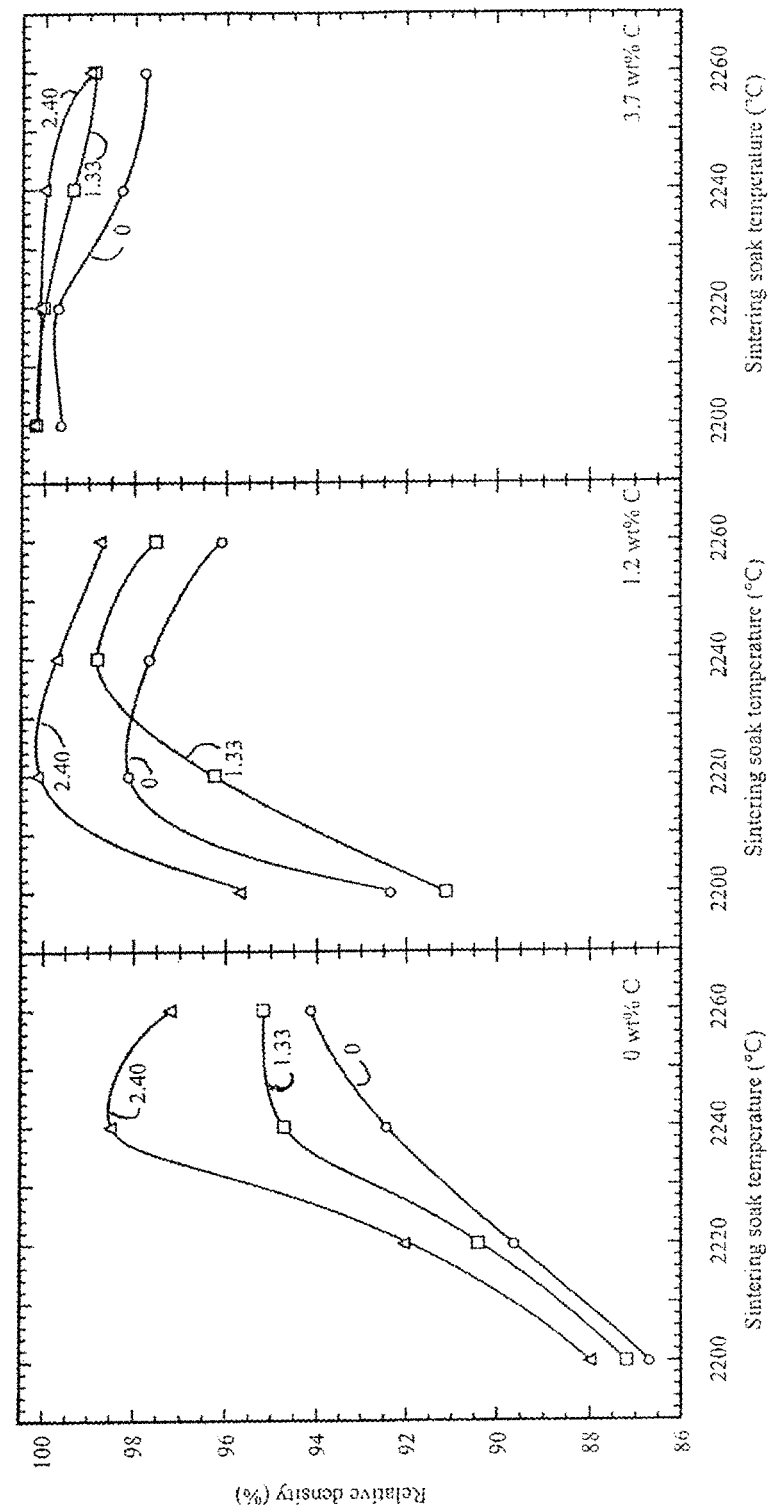
FIGS. 6A, 6B, and 6C graphically show relative densities of samples of FIGS. 5A, 5B and 5C respectively after post-HIPing as a function of sintering soak temperature. Numbers labeling various traces indicate the weight percentage of titanium (on an as-batched basis).

In a second series, the effect of higher concentrations of Ti and lower sintering soak temperatures than the previous study were evaluated, based on trends pointing toward the highest hardnesses in the previous study. In addition, to clarify the individual effect of Ti additions, a 0 wt % Ti addition composition series was prepared and evaluated. FIGS. 5A-5C show the relative densities achieved with these compositions after pressureless sintering and before HIPing. As before, relative densities increased with higher carbon content. In the second series, relative density after pressureless sintering heat-treatment generally increased with increasing Ti content. Relative densities of these specimens after HIPing are shown in FIGS. 6A-6C. For 1.2 wt % C, sintering soak temperatures above 2220° C. generally resulted in lower HIPed relative densities, even though sintered relative density increased with increasing sintering soak temperature.

TABLE 5

Hardness Values from the Samples in the Second Series (± values represent standard deviation)

| Sintering Soak Temperature (° C.) | Carbon Content (wt %) | Titanium Content (wt %) | Hardness (kg/mm²) |
|---|---|---|---|
| 2200 | 3.7 | 0 | 2780.1 ± 70.5 |
| 2200 | 3.7 | 1.33 | 3137.6 ± 99.7 |
| 2200 | 3.7 | 2.40 | 2943.4 ± 87.9 |
| 2220 | 1.2 | 0 | 2856.2 ± 76.5 |
| 2220 | 1.2 | 2.40 | 3130.3 ± 82.0 |
| 2220 | 3.7 | 0 | 2740.6 ± 141.6 |
| 2220 | 3.7 | 1.33 | 2709.3 ± 155.5 |
| 2220 | 3.7 | 2.40 | 2845.4 ± 97.5 |
| 2240 | 0 | 0 | 1956.7 ± 321.0 |
| 2240 | 0 | 1.33 | 2332.9 ± 308.3 |
| 2240 | 0 | 2.40 | 2541.6 ± 229.7 |
| 2240 | 1.2 | 0 | 2579.0 ± 126.9 |
| 2240 | 1.2 | 1.33 | 2724.9 ± 175.4 |
| 2240 | 1.2 | 2.40 | 2776.3 ± 179.3 |
| 2240 | 3.7 | 0 | 2504.0 ± 163.3 |
| 2240 | 3.7 | 1.33 | 2620.0 ± 216.3 |
| 2240 | 3.7 | 2.40 | 2692.7 ± 150.7 |
| 2260 | 0 | 0 | 2351.7 ± 229.1 |
| 2260 | 0 | 1.33 | 2269.9 ± 319.8 |
| 2260 | 0 | 2.40 | 2339.2 ± 279.7 |
| 2260 | 1.2 | 0 | 2282.2 ± 186.7 |
| 2260 | 1.2 | 1.33 | 2488.7 ± 259.4 |
| 2260 | 1.2 | 2.40 | 2439.1 ± 229.5 |
| 2260 | 3.7 | 0 | 2219.4 ± 285.2 |
| 2260 | 3.7 | 1.33 | 2528.4 ± 115.0 |
| 2260 | 3.7 | 2.40 | 2585.8 ± 158.5 |

Note that the samples in Table 5 are identified based on the powder composition used (see Table 3). Vickers hardness values for these post-HIPed samples are shown in Table 5 and FIGS. 7A-7C. Specimens of lower HIPed density were not evaluated for hardness. For specimens with no added carbon, the 2240° C. sintering soak temperature yielded samples whose hardness increased with relative density (increasing Ti content), as expected. For these compositions soaked at 2260° C., the hardnesses and HIPed relative densities of the various Ti-content specimens merged. Hardnesses were generally higher for the 1.2 and 3.7 wt % C specimens as compared to specimens with no added carbon. For these carbon-containing specimens, lower sintering soak temperatures resulted in higher hardnesses, which corresponds to increasing HIPed relative densities. For the 2220-2240° C. range, for a given sintering soak temperature, hardness decreased when increasing the carbon content from 1.2 to 3.7 wt %, even though relative density increased. The 3.7 wt % C, 1.33 wt % Ti specimen exposed to a sintering soak temperature of 2200° C., and the 1.2 wt % C, 2.40 wt % Ti specimen with a sintering soak temperature of 2220° C., reached the highest attained hardnesses, in fact achieving values higher than pressured assisted densified (PAD) boron carbide, which is the benchmark value commonly used to assess the hardness of a boron carbide article. FIGS. 7A-7C include a dashed line intended to show the hardness value of a PAD boron carbide, which is typically around 2600 Vickers.

Microstructure

Figure 8:
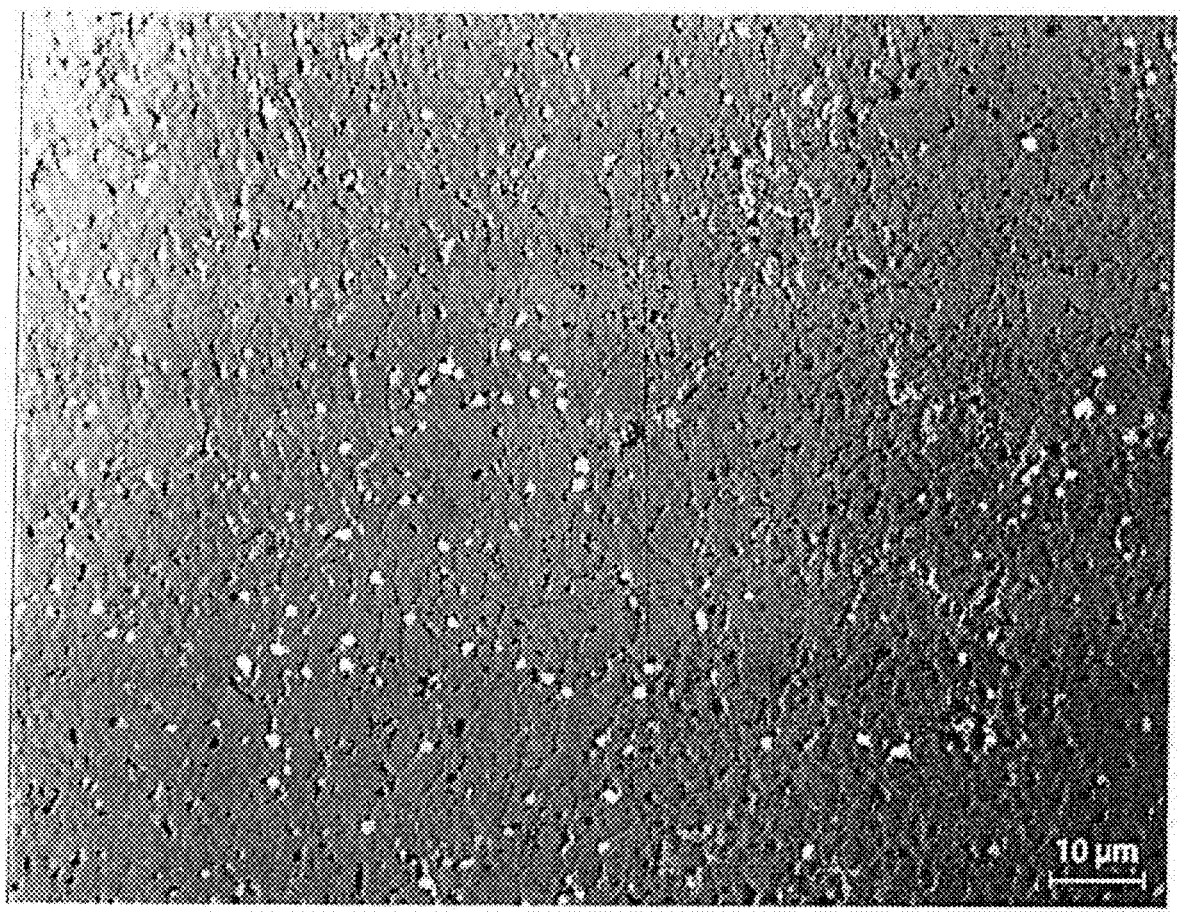
FIG. 8 shows an optical micrograph of HIPed sample prepared from a powder composition containing 1.33 wt % Ti and 3.7 wt % C, which was exposed to a pressureless sintering soak temperature of 2200° C.
Figure 9:
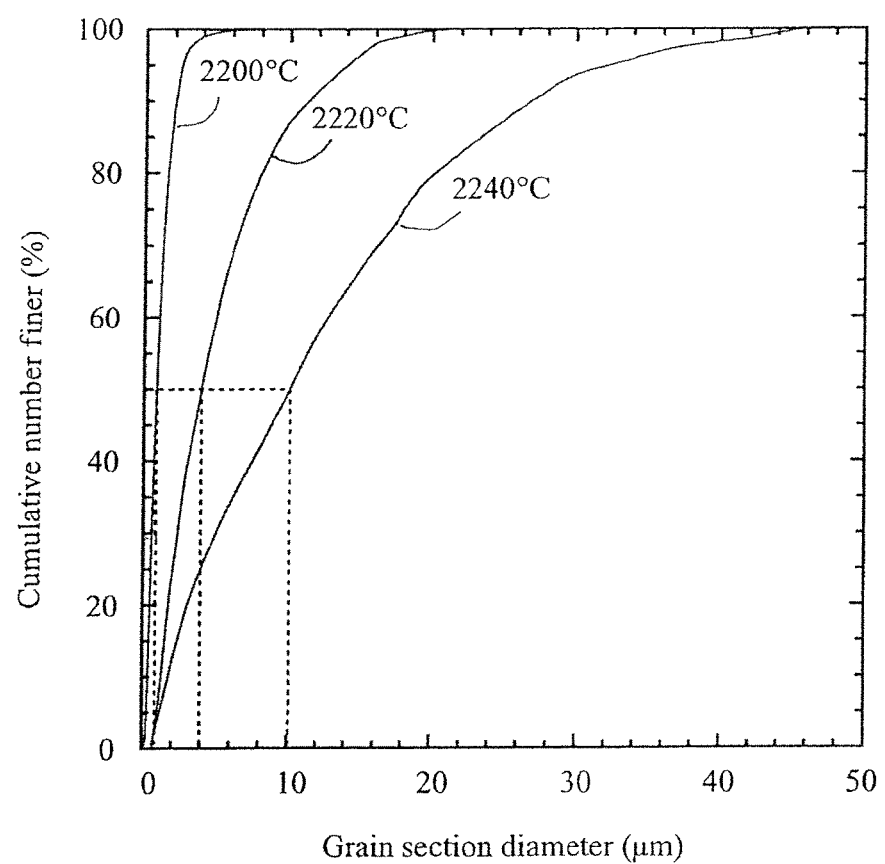
FIG. 9 graphically shows cumulative percent number finer plots based on the line-intercept method analysis of optical micrographs of polished sections of samples prepared from a powder composition containing 1.33 wt % Ti, 3.7 wt % C. Median grain size ($d_{50}$) values are indicated by the dashed lines.
Figure 10A:
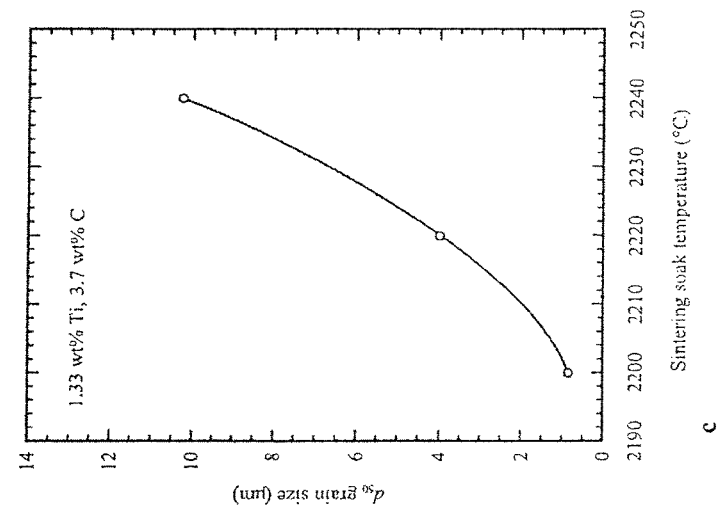
FIGS. 10A, 10B and 10C graphically show median grain sizes determined from cumulative percent finer plots ($d_{50}$) generated from image analyses (linear intercept method) of optical micrographs of selected samples prepared according to the present invention.
Figure 10B:
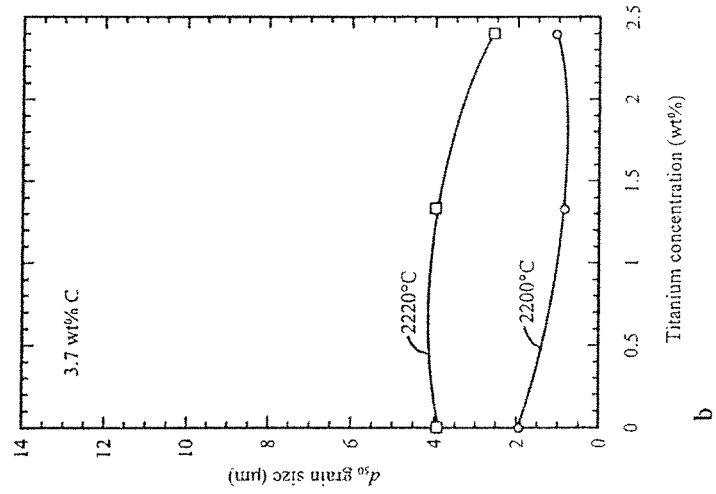
Figure 10C:
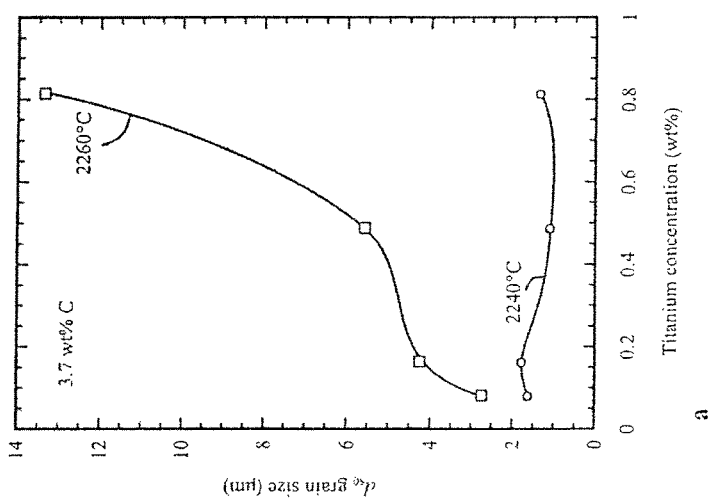

An example optical micrograph of a polished and electrolytically-etched (which exposed the grain boundaries) specimen cross-section surface is shown in FIG. 8. Dark regions are presumed to be graphite, graphite rich, or pores from which graphite was removed in the polishing process. Light-shaded regions are titanium diboride. Cumulative percent number finer (CPNF) plots were generated from quantitative analyses of such micrographs (e.g. FIG. 9) for selected samples from the first and second series. Median grain diameters ($d_{50}$, i.e. the 50% points in CPNF plots) for samples made with powder compositions containing 3.7 wt % C are displayed in FIGS. 10A-10C. In FIG. 10A, grain size increased with increasing titanium content for a sintering soak temperature of 2260° C. Grain size was finer and more insensitive to titanium content for the sintering soak temperature of 2240° C. Correspondingly, the hardnesses were higher for the finer grain-sized specimens exposed to the lower sintering soak temperature (FIG. 4A). An apparent inconsistency is seen in the results of the second series shown in FIG. 10B, in that a sintering soak temperature of 2220° C. resulted in larger grains than the soak temperature of 2240° C. used in the first series (FIG. 10A). However, generally, grain sizes for samples made with powder compositions containing 3.7 wt % carbon remained small, resulting in a higher hardness values, with decreasing sintering soak temperature.

Figure 11A:
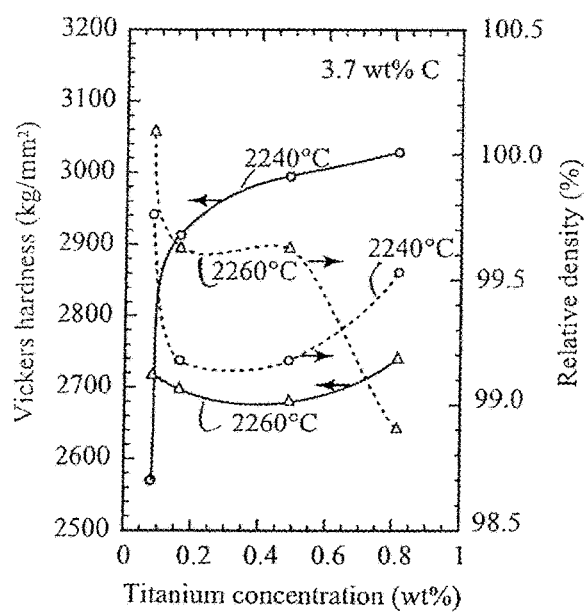
FIGS. 11A and 11B graphically show HIPed relative density and hardness values for the samples of FIGS. 3A-3C and 6A-6C.
Figure 11B:
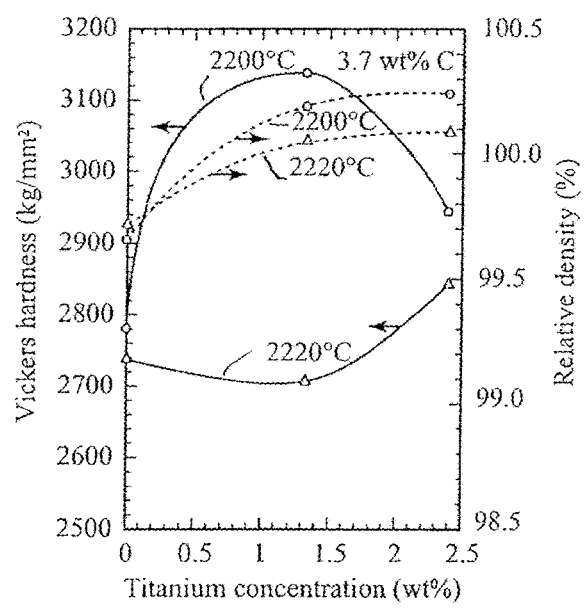
Figures 12A, 12B, 12C, 12D:
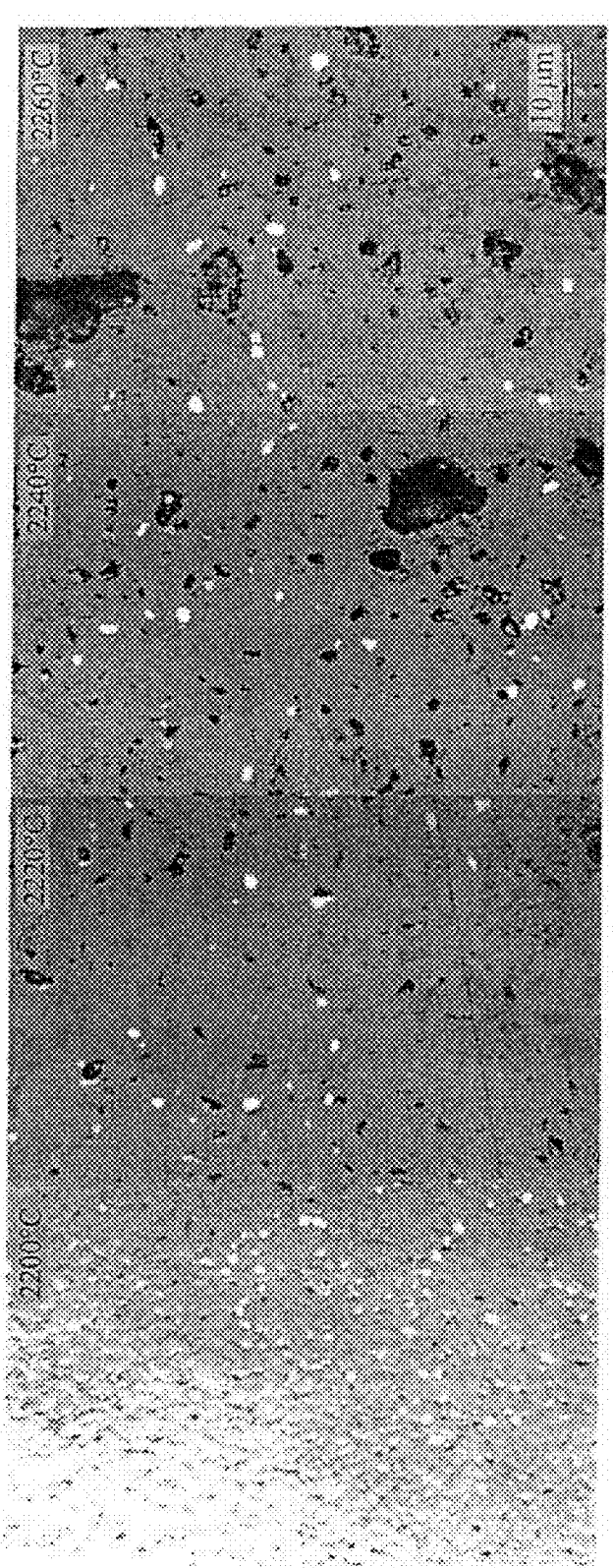
FIGS. 12A, 12B, 12C and 12D show optical micrographs of sintered and post-HIPed samples prepared with powder composition containing 1.33 wt % Ti and 3.7 wt % C, soaked during pressureless sintering at 2200° C.

The density and hardness data for samples made with powder compositions that contained 3.7 wt % C in the first series (FIGS. 2A-2C and 3A-3C and FIGS. 4A-4B) were re-plotted in a different way in FIG. 11A. It is apparent that while the higher sintering soak temperature of 2260° C. yielded generally higher HIPed relative densities than those exposed to the lower soak temperature of 2240° C., the hardnesses of the less dense specimens were actually higher. The differentiating feature, beyond relative density, for specimens exposed to these two sintering soak temperatures, is the median grain sizes shown in FIG. 10A; grain sizes were significantly smaller for the lower sintering soak temperature (harder) specimens.

Figure 13:
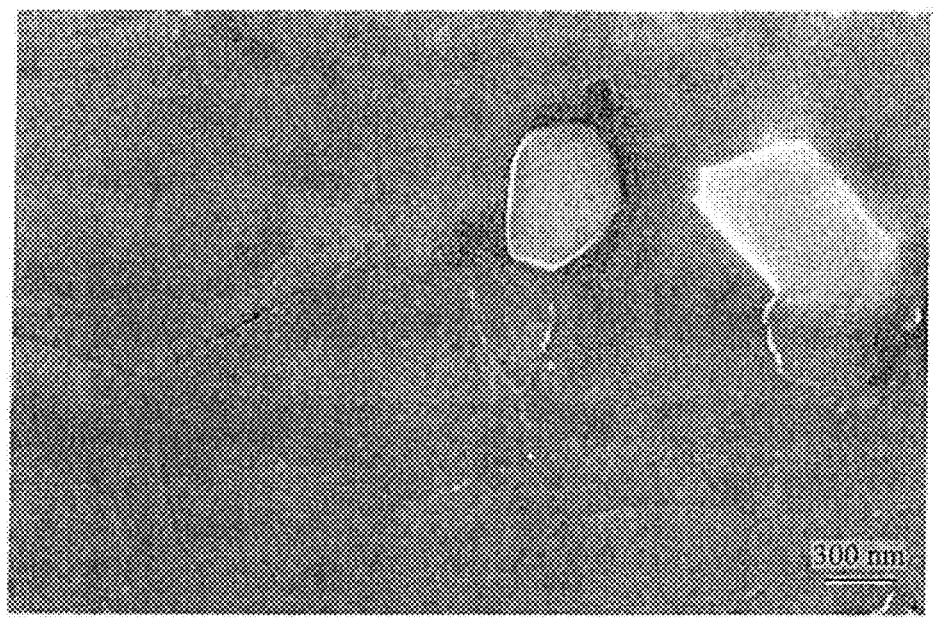
FIG. 13 shows an SEM micrograph of a polished specimen cross section prepared from a powder composition containing 2.40 wt % Ti and 1.2 wt % C, sintered at a pressureless sintering soaking temperature of 2220° C. and then post-HIPed.
Figure 14A:
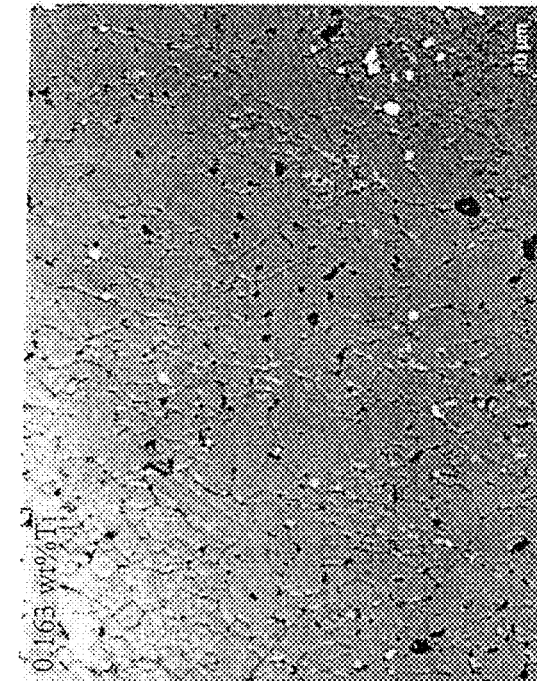
FIGS. 14A, 14B, 14C and 14D show optical micrographs of polished/etched sections of pressureless sintered and HIPed specimens prepared from powder compositions containing 0.018 (FIG. 14A), 0.163 (FIG. 14B), 0.488 (FIG. 14C), and 0.814 (FIG. 14D) wt % titanium and 3.7 wt % carbon, pressureless sintered at 2240° C.
Figure 14B:
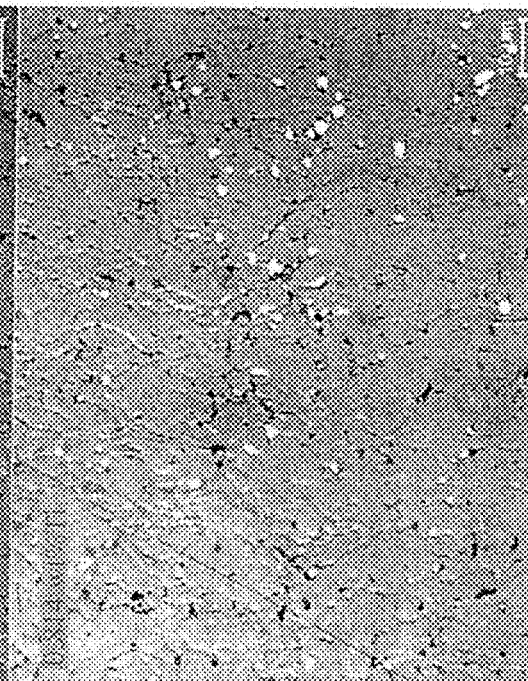
Figure 14C:
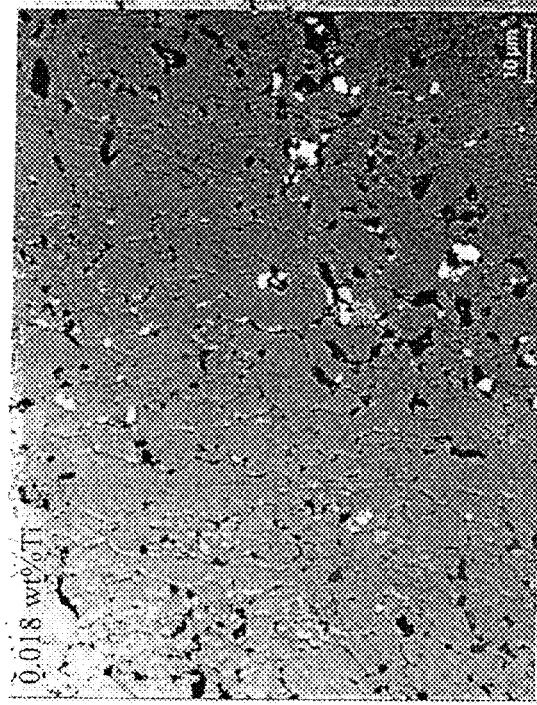
Figure 14D:
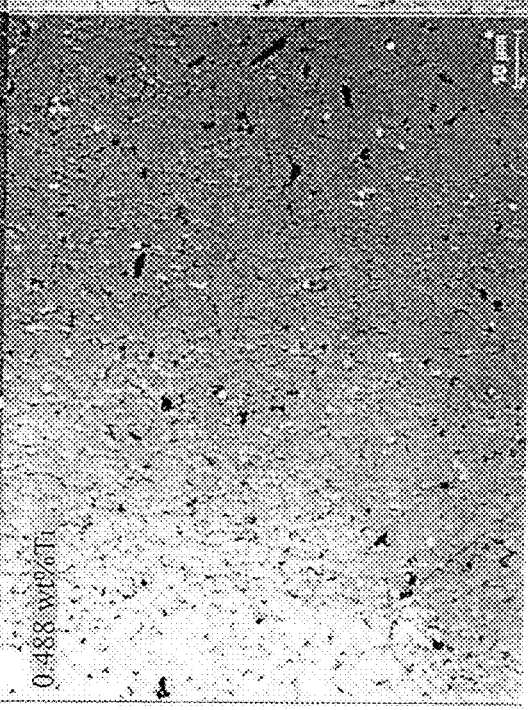
Figure 15A:
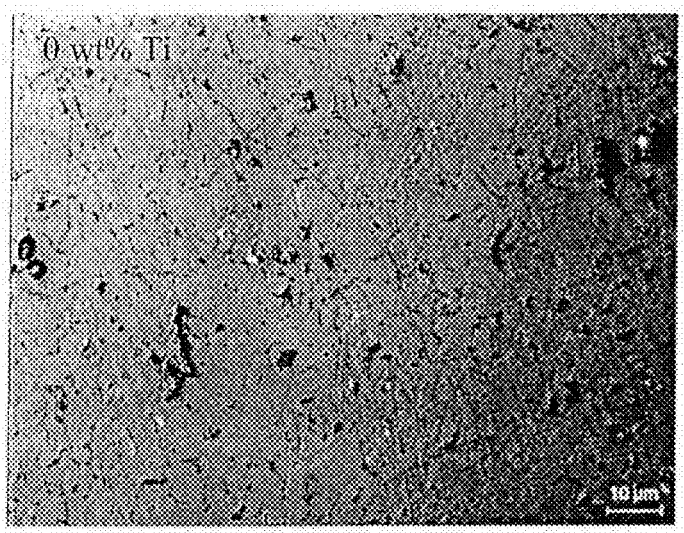
FIGS. 15A, 15B and 15C show optical micrographs of polished/etched sections of sintered and HIPed samples prepared from powder compositions containing 0 (FIG. 15A), 1.33 (FIG. 15B), and 2.4 (FIG. 15C) wt % titanium and 3.7 wt % carbon, pressureless sintered at 2200° C.
Figure 15B:
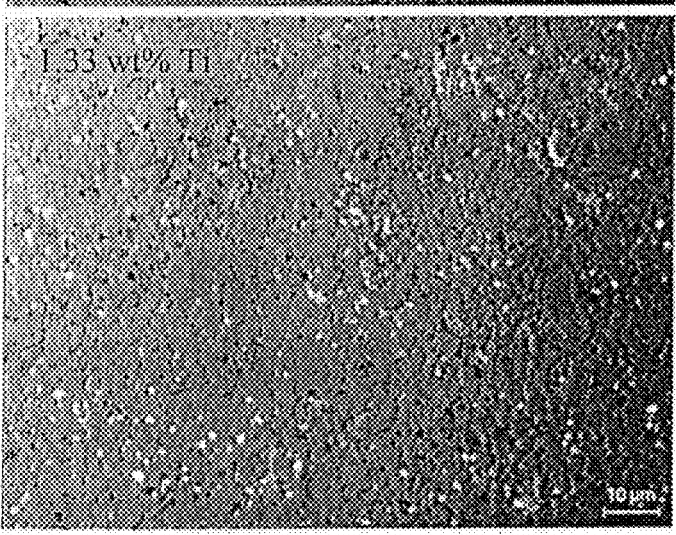
Figure 15C:
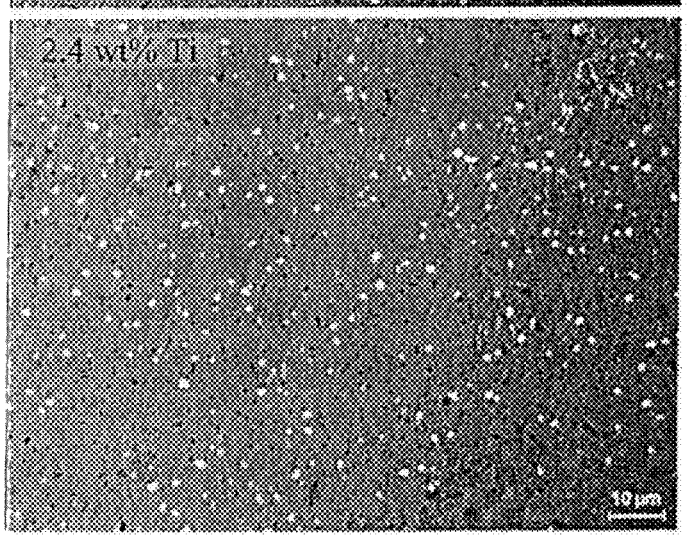
Figure 16:
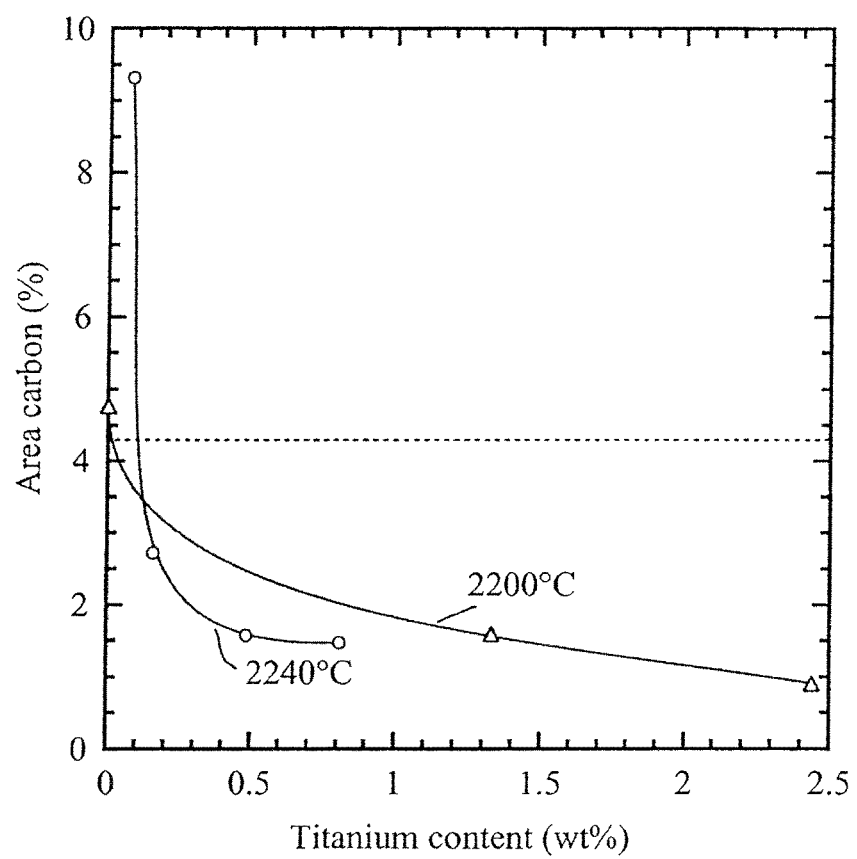
FIG. 16: graphically shows area fractions (percent) of graphite based on digital analysis of the micrographs in FIGS. 14A-14C and 15A-15C (3.7 wt % C). The horizontal dashed line indicates the 3.7 wt % C, which translates to 4.29 vol % C.

The samples made with a powder composition that included 3.7 wt % C and 1.33 wt % Ti, exposed to a sintering soak temperature of 2200° C., had a remarkably small $d_{50}$ grain size of 0.84 µm (FIG. 10B), which is only about 40% larger than the $d_{50}$ particle size of 0.6 µm of the boron carbide powder used to prepare the powder composition. Typically, the median grain size of a sintered boron carbide article made with boron carbide powder is several times larger than the median grain size of the boron carbide powder used to prepare the article because of the grain growth which occurs during the final stages of sintering. However, samples prepared according to the present invention showed median grain sizes, which were well less than 100% larger than the median grain size of the boron carbide powder used in their preparation, which advantageously led to the higher hardness values reported herein. For this composition exposed to various sintering soak temperatures (FIG. 10D), an increase in median grain size of an order of magnitude is observed when increasing the pressureless sintering soak temperature from 2200° C. to 2240° C. As shown in FIGS. 12A-12D, over this sintering soak temperature range, substantial coarsening of (dark) graphite regions occurred. There is no visual indication of coarsening of Ti-containing (light-shaded, $TiB_2$) grains. The SEM micrograph in FIG. 13 shows distinct light-shaded sharp-facet grains of $TiB_2$ in a $B_4C$ matrix. The grain boundaries between $B_4C$ grains show no visibly distinct second phases. FIGS. 14A-14D and 15A-15D show the changes in microstructure with increasing Ti content for a sample made with a powder composition that included 3.7 wt % C with sintering soak temperatures of 2240 and 2200° C., respectively. For both sintering soak temperatures, initial increases in Ti resulted in a substantial decrease in size of the graphite grains. FIG. 16 graphically illustrates the results of a quantitative analysis of the micrographs to determine the percentage of the area occupied by the carbon containing phase, namely graphite. Ti additions of 0.163 wt % or more decreased the volume percent of graphite to values below those which were added via phenolic resin (the reduction in volume percentage is being assumed to be based on the reduction in the area occupied by the carbon containing phase (graphite)). With the exception of the sample prepared from a powder composition that included 2.4 wt % Ti and exposed to a soak temperature of 2200° C., this trend of decreasing graphite concentration in the microstructure with increasing Ti additive corresponds to an increase in hardness.

Figure 17:
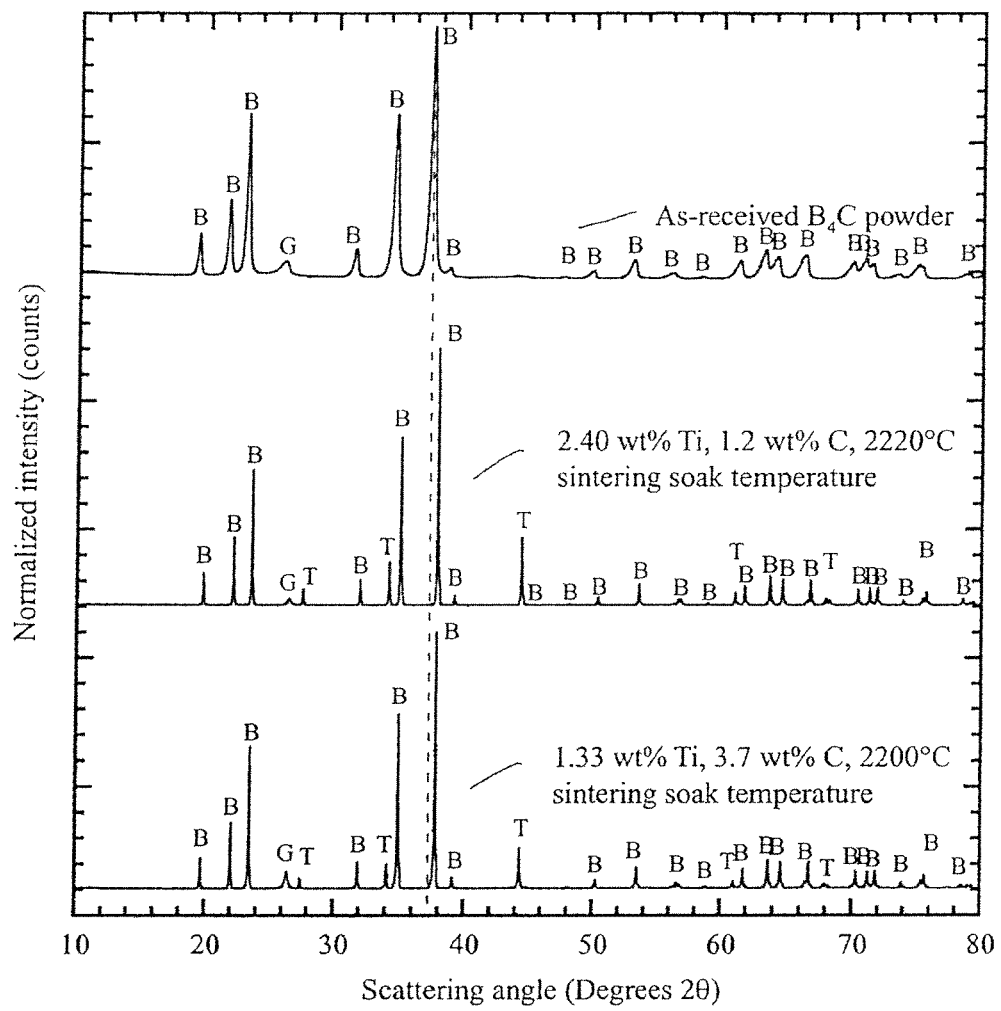
FIG. 17 shows X-ray diffraction patterns of as-received boron carbide powder as well as ground and polished surfaces of two sintered and HIPed samples prepared from a powder composition having 2.4 wt % Ti, 1.2 wt % C, and pressureless sintered at 2220° C., and another powder composition having 1.3 wt % Ti, 3.7% carbon and pressureless sintered at 2200° C.

XRD patterns were taken for the two compositions yielding the highest hardnesses (prepared from a powder composition containing 1.33 wt % Ti, 3.7 wt % C and pressureless sintered at 2200° C., and prepared from a powder composition containing 2.4 wt % Ti, 1.2 wt % C and pressureless sintered at 2220° C.) in order to determine the phases present (FIG. 17). The integrated intensity of the most intense $TiB_2$ diffraction peak (44.93° 2θ) increased with added Ti content, as expected. The integrated intensity of the most intense diffraction peak for graphite at 26.426° 2θ followed the trend of increasing with the amount of added carbon. Remarkably, the integrated intensity for graphite-3R in the as-received $B_4C$ powder was greater than the two sintered samples to which were prepared from powder compositions with added carbon (along with titanium).

Third Series of Samples Prepared with Different Boron Carbide Powders

To evaluate the effect of the use of the water-soluble $C_6H_{10}O_8Ti\cdot2(NH_4)$ additive and phenolic resin on different boron carbide powder sources, a different grade of powder from H.C. Starck, Starck HS powder, along with two powders from UK Abarasives (Northbrook, Ill.), with median particle sizes of 0.5 and 1.7 µm, were evaluated. The process for the preparation of samples for this comparative study was the same as the process described above for the first series of samples except that the boron carbide powder source was different.

Use of $C_6H_{10}O_8Ti\cdot2(NH_4)$ and Phenolic Resin with H. C. Starck HS $B_4C$ Powder To evaluate the efficacy of a method according to the present invention with different powder sources, a composition of 1.33 wt % Ti (via $C_6H_{10}O_8Ti\cdot2(NH_4)$) 3.7 wt % C (via phenolic resin) was used with a different powder, i.e. H. C. Starck HS $B_4C$ powder (See Table 5 for the characteristics of the powder). This powder, had a slightly higher median particle size, and a broader particle size distribution than the H. C. Starck HD $B_4C$ described previously (See Table 1). The HS $B_4C$ is also a significantly more expensive powder.

TABLE 5

| Boron Carbide Powder Characteristics (HS) | |
|---|---|
| Specific Surface area (m²/g) | 18.8 |
| Particle size (µm) | $d_{90}$ = 2.99, $d_{50}$ = 0.84, $d_{10}$ = 0.24 |
| Impurity Content (wt %) | 1.5 O, 0.41 N, 0.09 Si, 0.022 Fe, 0.055 Si, 0.003 Al, 0.23 other |
| Carbon Content (wt %) | 22.26 |
| B:C Ratio | 3.76 |

Figure 27:
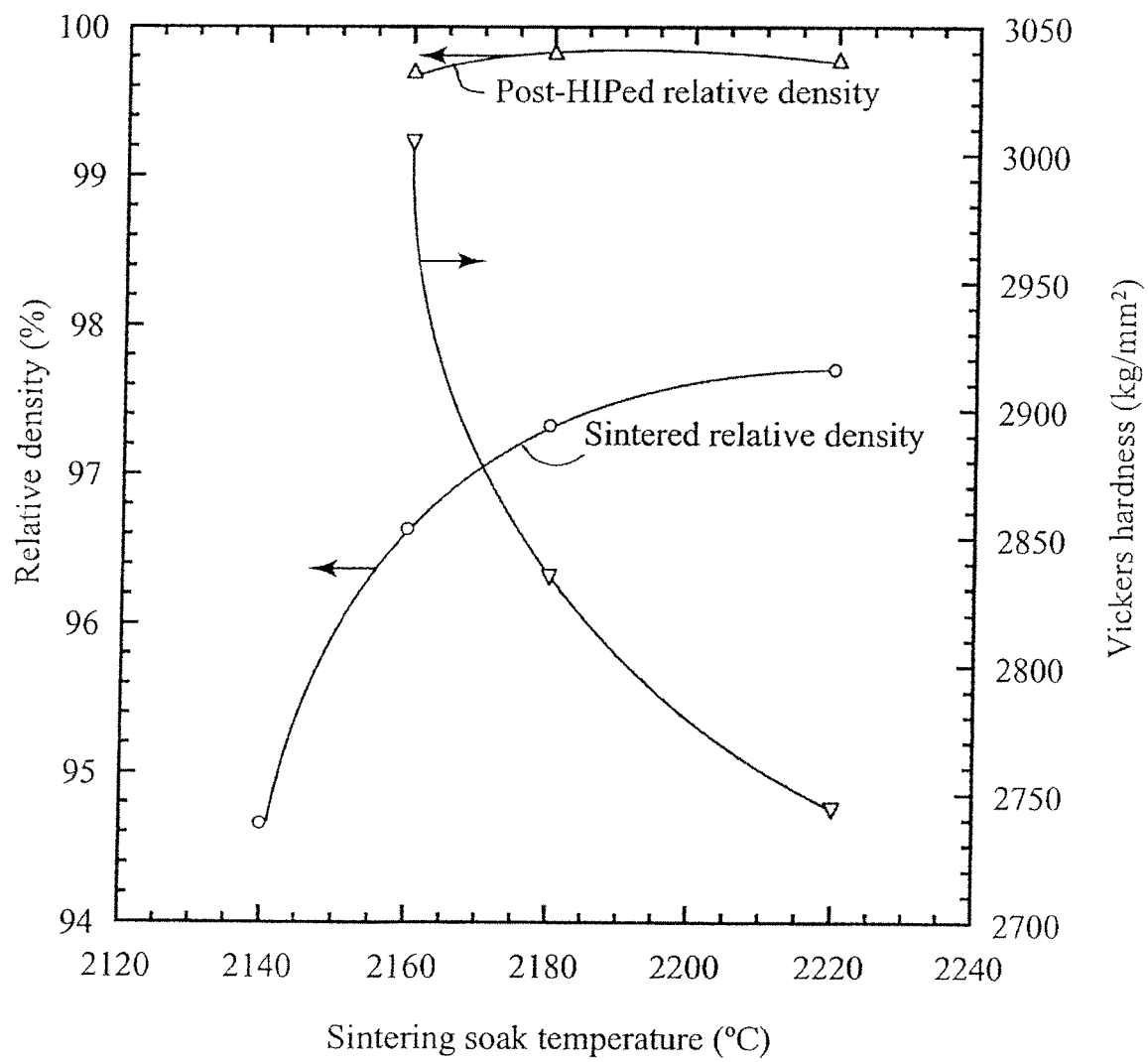
FIG. 27 graphically shows relative densities and hardnesses of samples prepared according to the present invention with a different starting boron carbide powder (H. C. Starck HS $B_4C$ powder), as a function sintering soak temperature, the powder composition of the sample was 1.33 wt % Ti and 3.7 wt % C.

FIG. 27 discloses the results obtained by preparing sample from the HS powder. The trends shown in FIG. 27 are similar to those observed for the HD powder; sintering soak temperatures at and above 2160° C. reached a closed porosity state in which HIPing brought the compacts close to theoretical density. The highest hardness was obtained for the 2160° C. soak temperature (3004.8 kg/mm$^2$), with hardness dropping with increasing sintering soak temperature. The broader particle size distribution of this powder facilitated a higher green density (geometric relative density after 1300° C. thermolysis heat treatment: 78-79%) than observed for HD (62-72%), in turn allowing for lower sintering soak temperatures to reach the closed porosity state. However, the highest hardness measured for this powder (to the limit of the experiments performed) was lower than the highest obtained for B$_4$C HD powder. Nevertheless, the experiment indicates that the method disclosed herein can result in attaining a high hardness value when a different boron carbide powder is used as the starting material.

Figure 28:
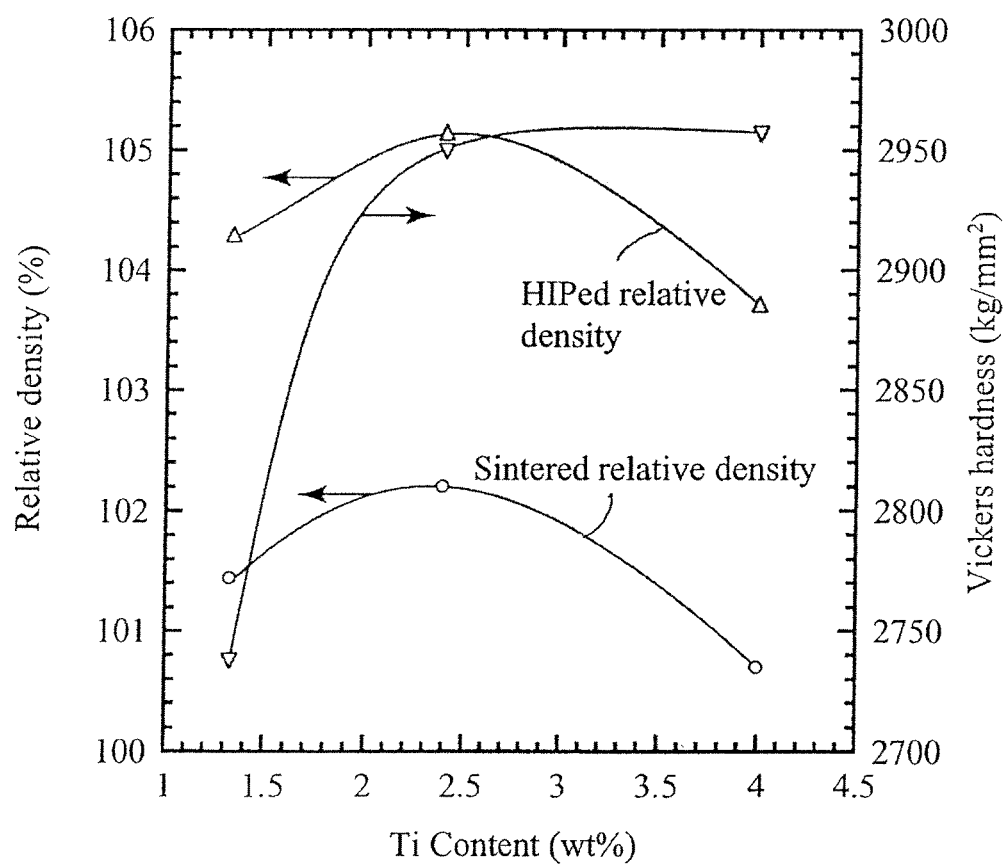
FIG. 28 graphically shows relative densities and hardnesses of samples prepared based on $B_4C$ powder manufactured by U. K. Abrasives, which had a median particle size of 0.5 µm. The sintering soak temperature was fixed at 2200° C. and the carbon content was fixed at 3.7 wt %.
Figure 29:
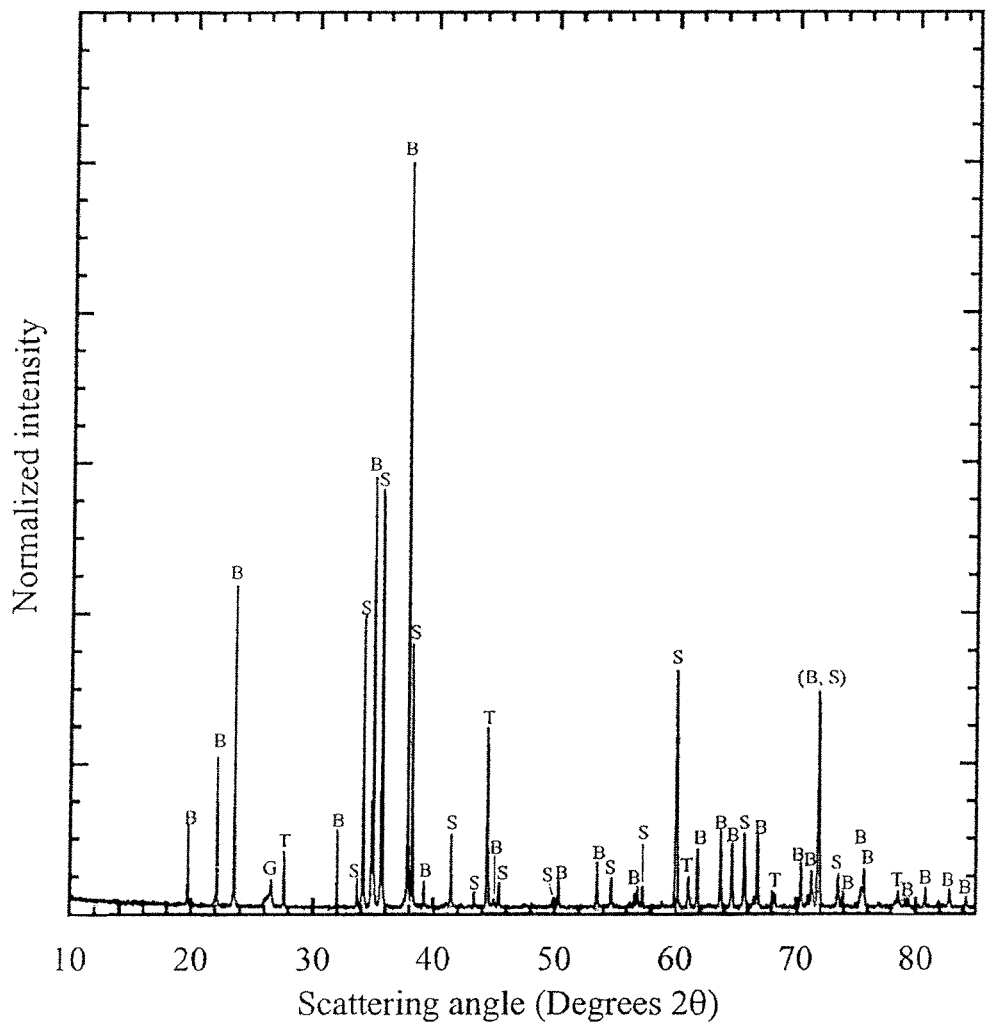
FIG. 29 shows an X-ray diffraction pattern of a post-HIPed sample made from a powder composition containing UK Abrasives powder ($d_{50}$=0.5 µm), 1.33 wt % Ti and 3.7 wt % C, exposed to a pressureless sintering soak temperature of 2200° C. B: $B_4C$, G: graphite, T: $TiB_2$, S: SiC.

Use of $C_6H_{10}O_8Ti.2(NH_4)$ and Phenolic Resin with Impure or Relatively Coarse B$_4$C Powder B$_4$C powder was obtained from UK Abrasives (Northbrook, Ill.), which had a manufacturer's specified median particle size of 0.5 μm. It was mixed with 3.7 wt % C and varying concentrations of Ti, using a fixed sintering soak temperature of 2200° C. FIG. 28 shows the relative densities of samples prepared using this boron carbide powder as a starting material. As shown in FIG. 28, relative densities were quite high. Note that relatively high hardness was reached with Ti content of around 2.4 wt %. A maximum hardness value of 2957 kg/mm$^2$ was reached with a Ti content of 4 wt %. The relative densities of over 100%, for both sintered and post-HIPed specimens, comes from the use of pure boron carbide as the basis for the theoretical density in relative density calculations; these powders contained a substantial amount of SiC, as shown in the XRD pattern in FIG. 29. Even with the presence of SiC notwithstanding, the results obtain support the conclusion that a method according to the present invention can be effective in attaining a high hardness value with a different boron carbide powder as a starting material (i.e. with impure sources of sub-micron d$_{50}$ boron carbide).

Figure 30:
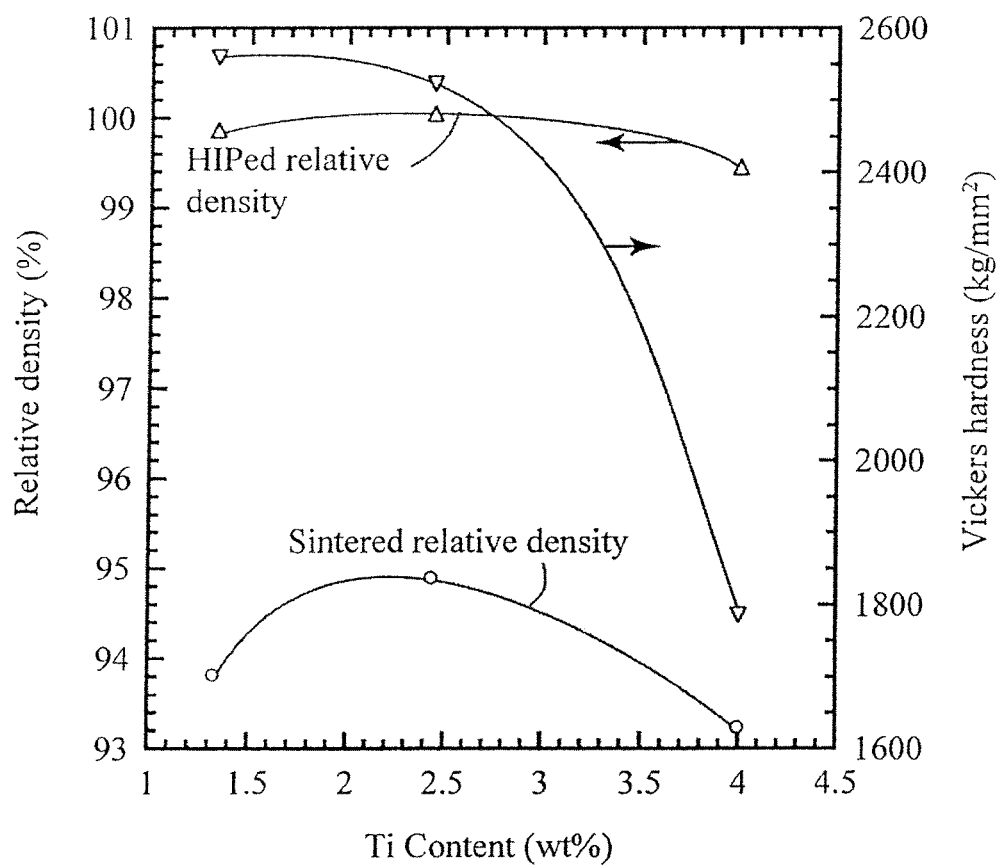
FIG. 30 graphically shows relative densities and hardnesses of samples prepared according to the present invention from a powder composition that contained $B_4C$ powder manufactured by U. K. Abrasives (which had a median particle size of 1.7 µm), and 5.15 wt % carbon. The sample was pressureless sintered at 2200° C.

To prepare another set of samples, boron carbide powder with a median particle size of 1.7 μm, obtained from the same source (UK Abrasives) was prepared according to the present invention with a powder composition containing 5.51 wt % C, various concentrations of Ti, and exposed to a sintering soak temperature of 2200° C. The results are disclosed in FIG. 30. As shown in FIG. 30, high HIPed relative densities could be obtained with relatively lower sintered relative densities (e.g. 93.8%). The data in FIG. 30 indicate that hardness values decreased with increasing Ti content. A hardness of 2560.2 kg/mm$^2$ for a sample made with a powder composition containing 1.33 wt % Ti was substantially lower than obtained in the best case with the organometallic additive to B$_4$C HD15 powder. However, this hardness is in line with that of the PAD-B$_4$C, the hardness for which is a benchmark value (see dashed line FIGS. 7A-7C). Since coarser powder such as this 1.7 μm (d$_{50}$) powder is substantially cheaper than sub-micron powder, the results obtained indicate that a method according to the present invention would allow for the densification of such cost-competitive powders into articles of use for many applications requiring high hardness.

The results of the studies with coarser and less expensive boron carbide powders indicate that a method according to the present invention may be used to prepare a powder composition that can be formed into a green body, pressureless sintered and HIPed to obtain high hardness values.

Experiments to Elucidate the Effect of Coatings

To determine the effect of coating boron carbide particles with a titanium containing coating, the evolution of phases during the heat treatment was studied. To study the evolution of phases, boron carbide pellets with the additive containing 1.33 wt % Ti and 3.7 wt % C were uniaxially pressed into 12.7 mm diameter cylinders at 181 MPa and then cold isostatically pressed at 345 MPa. It is important to note that the lot number of the HD15 (H.C. Starck, GmBH) used for this particular study was different than the lot number for all other studies using HD15 in this disclosure. The green parts were placed in a graphite crucible inside in a laboratory graphite furnace. The furnace was evacuated using a mechanical vacuum pump to less than 80 mTorr and then back-filled with pure He gas to atmospheric pressure. The gas pressure was maintained at atmospheric pressure via a two-flask bubbler setup. The parts were heated at 15° C./min to a given temperature and then cooled with a setpoint cooling rate of 100° C./min, which effectively shut the furnace heating elements off after a couple of minutes, and the parts cooled at the natural cooling rate of the furnace. The selected quench temperatures were 600, 800, 1000, 1300, 1600, 1900, and 2200° C. A final quench experiment was performed in which a pellet was heated at 15° C./min to 2200° C. and held for 30 minutes to simulate typical sintering conditions. Phase identification was performed by X-ray diffraction as described above.

Figure 18A:
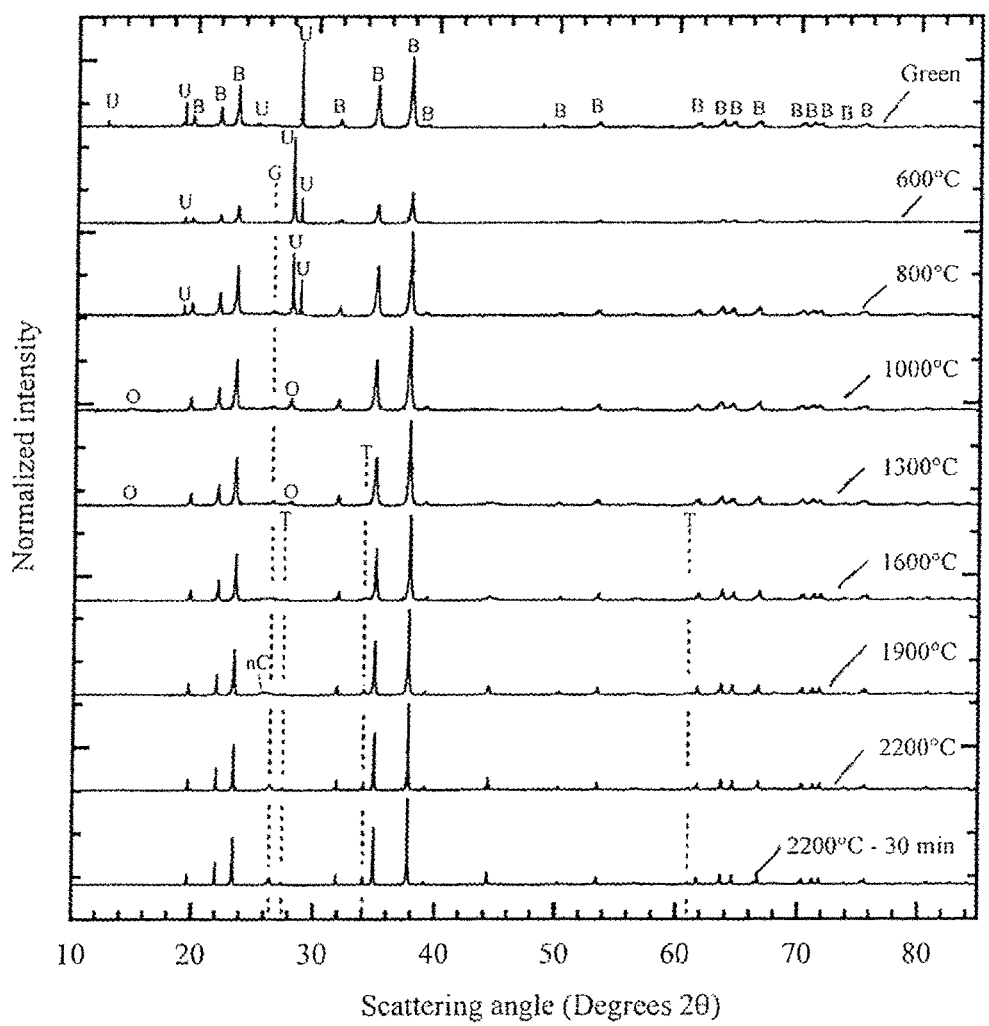
FIG. 18A shows XRD patterns of green compact specimens (different lot number of Starck HD15 powder than other data) prepared from powder compositions composed of 3.7 wt % C and 1.33 wt % Ti additions, heated at 15° C./min to the indicated temperature, and then furnace cooled. B: $B_4C$, U: Unidentified phase, G: Graphite, O: $B_2O_3$, T: $TiB_2$, nC: carbon nanotubes.
Figure 18B:
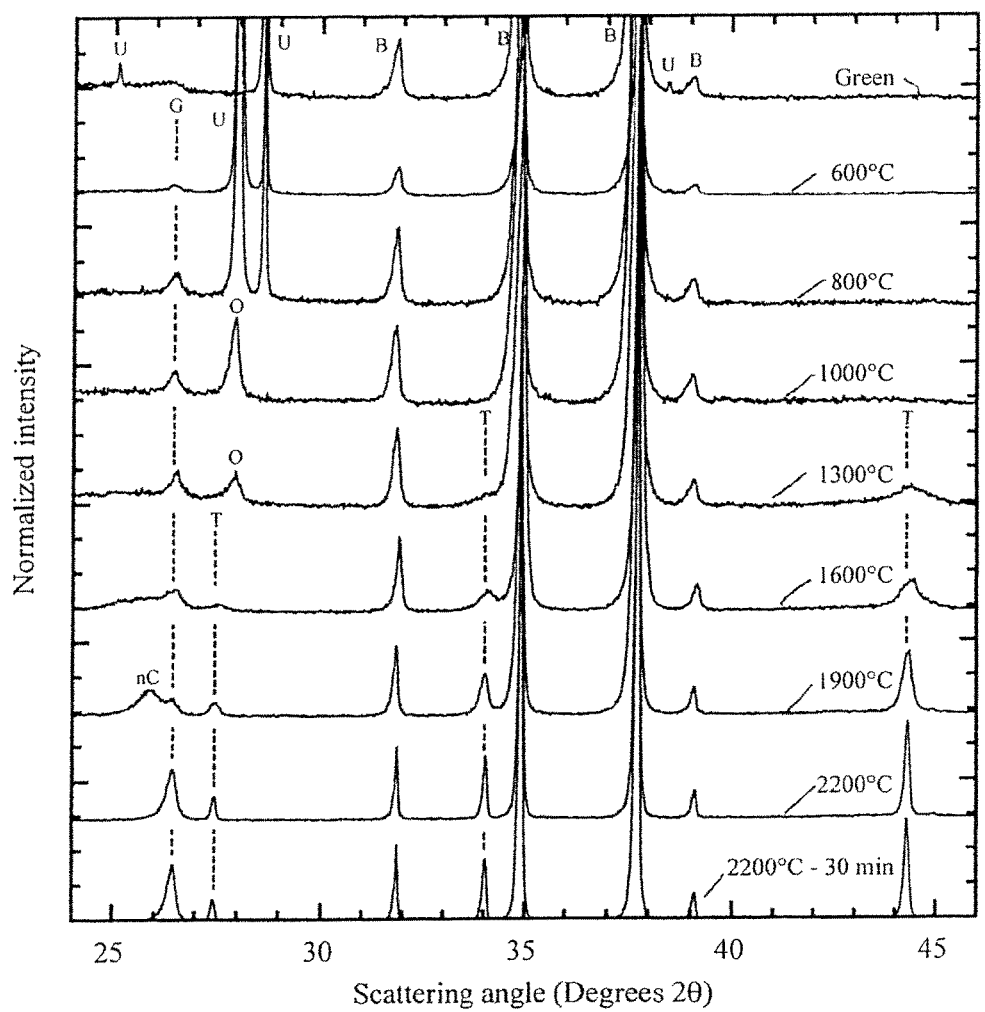
FIG. 18B shows a magnified view (restricted 2θ range) of FIG. 18A.

FIG. 18A shows XRD results for specimens heated to and quenched from various temperatures. Based on comparing green-state XRD patterns of the two lot numbers, the B$_4$C HD powder lot in FIG. 18A shows significantly less carbon than the B$_4$C HD powder lot represented in FIG. 17. FIG. 18B is a magnified view over a more restricted 2θ range permitting ease of view of graphite and TiB$_2$ peaks. The data indicates that the graphite peak grew as carbon was liberated from the pyrolysis of phenolic resin. The phase labeled U corresponds to the crystalline precursor phase precipitated from the water-soluble $C_6H_{10}O_8Ti.2(NH_4)$ additive. The emergence of the U' peaks is interpreted to be an intermediate solid residue of the $C_6H_{10}O_8Ti.2(NH_4)$ after partial decomposition. The disappearance of that phase, with no other identifiable titanium-containing phase at 1000° C., is interpreted to indicate solubility of the titanium-containing species into the boron oxide liquid phase residing on particle surfaces, which in other work has been shown to persist as a coating on boron carbide particles up to 1600-1800° C. under a constant heating rate. The titanium-containing phase is speculated to be titania, since in this form, it is most easily soluble in the boria liquid (eutectic temperature 400-450° C.). Some of this borate liquid crystallized as opposed to becoming a glass on cooling and was identified as boron oxide in XRD patterns at 1000 and 1300° C. After heating to 1300° C., TiB$_2$ is first detected, and its concentration increased with increasing quench temperature up to 2200° C. It is interpreted that as boron oxide volatilized away, the increasingly titania-rich liquid phase reacted with graphite and boron carbide to form TiB$_2$. Over the temperature range 1300-2200° C., the development of a TiB$_2$ phase was concurrent with the formation of a phase (identified from 1600 and 1900° C. quenches) corresponding to a nano-scale carbon, and a decrease in relative intensity of the graphite peak for the 1900° C. quench trace is apparent. While the inventors do not wish to be bound to any theory proposed herein, it appears that the data obtained from the study of the evolution of phases suggests that the coatings on the boron carbide particles in the powder composition prepared according to the present invention facilitate much more intimate contact of reactants (C, $TiO_2$, and $B_4C$) than could be obtained using particulate (e.g. $TiO_2$, TiC, $TiB_2$) additions, resulting a fine-grained microstructure with fine, well dispersed $TiB_2$ and graphite second phases (see Analysis of Results section).

Analysis of Results

Carbon in the form of graphite, is a well-known sintering aid for pressureless sintering of boron carbide. It is well known that carbon reacts with the boron oxide coatings on boron carbide particles and eliminates them so that the onset of sintering is substantially lowered. Carbon may facilitate "activated sintering" whereby it induces the formation of defects near the grain boundaries during sintering, providing conduits for mass diffusion. The presence of carbon along the grain boundary can function to inhibit exaggerated grain growth which can otherwise trap porosity within grains (where their subsequent elimination with further heat-treatment is not feasible). The effect of carbon on increasing relative density are apparent from the data disclosed in FIGS. 2A-2C and 5A-5C, which indicate that higher sintered relative densities were observed with increasing carbon content, and also sintered relative densities were less sensitive to the selection of sintering soak temperature with increasing carbon content (i.e. slopes of curves in FIG. 5 decrease with increasing carbon content); this implies better management of abnormal grain growth at higher sintering soak temperatures.

Although both sintered and post-HIPed relative densities were higher with higher carbon additive content, hardness did not necessarily follow. As can be seen in FIGS. 7B and 7C for 0 wt % Ti additive, hardnesses of samples prepared with powder compositions having 3.7 wt % C are lower than those with 1.2 wt % titanium additive for any given sintering soaking temperature. Graphite has weak van der Waals bonding in one crystallographic direction; microstructural regions concentrated with graphite would have very low hardness. Thus, an increasing concentration of graphite in the microstructure would lower measured hardness. The higher graphite in the samples prepared from powder compositions having 3.7 wt % C was in fact more detrimental to hardness (FIGS. 7B and 7C) than the higher porosity (FIGS. 6B and 6C) in the 1.2 wt % C specimens. This has always been the tradeoff with using carbon as a sintering aid for boron carbide. That is, carbon facilities densification, but its presence in the microstructure imbues lower hardness.

Simultaneous introduction of carbon and titanium in the form of water-soluble species has the distinct advantage of intimately coating the surfaces of all boron carbide particles in the granulated powder with phenolic resin and a titanium-containing precursor phase. After heat-treatment to between 800 and 1000° C., the titanium-bearing precursor phase remarkably disappears from XRD patterns, with no detected Ti-containing crystalline phase taking its place (FIGS. 18A and 18B). It is interpreted that the precursor phase decomposes into titania which is soluble in the borate liquid phase (forming a glass after cooling to room temperature, which cannot be detected by XRD). In the 1000-1300° C. range, graphite would react away boria liquid (along with the boria component in the liquid having an appreciable vapor pressure); the titania, enriched in the liquid phase, is interpreted to react with graphite and $B_4C$ according to the following reaction:

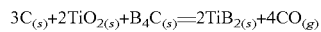

The graphite in the microstructure would then be replaced by particles of $TiB_2$ which have hardnesses competitive with boron carbide (Knoop hardnesses, 100 g load: 2800 kg/mm$^2$ for $B_4C$, 2850 kg/mm$^2$ for $TiB_2$ [8]). XRD (FIG. 17) and microstructural analyses (FIG. 16), provide compelling evidence of graphite extraction because of the presence of the titanium additive. For the first and the second experimental series prepared based on powder compositions containing 3.7 wt % C, hardness generally increased with increasing titanium content. Higher titanium content consumed more graphite during sintering heat treatment, attenuating the concentration of soft-spots (graphite) in the microstructure, replacing them with hard $TiB_2$ regions.

For a given composition, with increasing sintering soak temperature, graphite grains coarsened and increased in volume percent (FIG. 12). The higher sintering temperature facilitated preferential vaporization of boron from boron carbide. The relative contributions of graphite coarsening and exaggerated grain growth with increasing sintering soak temperature to decrease in hardness with increasing sintering soak temperature has not been differentiated.

The maximum post-HIPed relative densities (FIGS. 3A-3C and 6A-6C) resulted from the use of sintering soak temperatures lower than those which yielded the highest relative densities after sintering (with no post-HIPing). The higher soak temperatures required to raise the sintered relative densities to their maximum facilitated more extensive grain growth, trapping more porosity within the grains where subsequent post-HIPing could not eliminate them.

There were cases shown in which specimens with lower post-HIPed relative densities in fact had higher hardnesses (FIG. 11A). This further shows the advantage of low sintering soak temperatures in minimizing grain growth; microstructures with grain sizes approaching the original particle sizes demonstrated the highest hardnesses. This is consistent with Hall-Petch behavior typical in ceramics in which hardness increases with decreasing (square root of) grain size.

These results clearly foster the previously non-obvious conclusion that the lowest sintering temperature which achieves a relative density no higher than that required to reach the closed-porosity state (required for HiPing to be effective) ultimately yields the highest hardness microstructures in post-HIPed samples.

Figure 31:
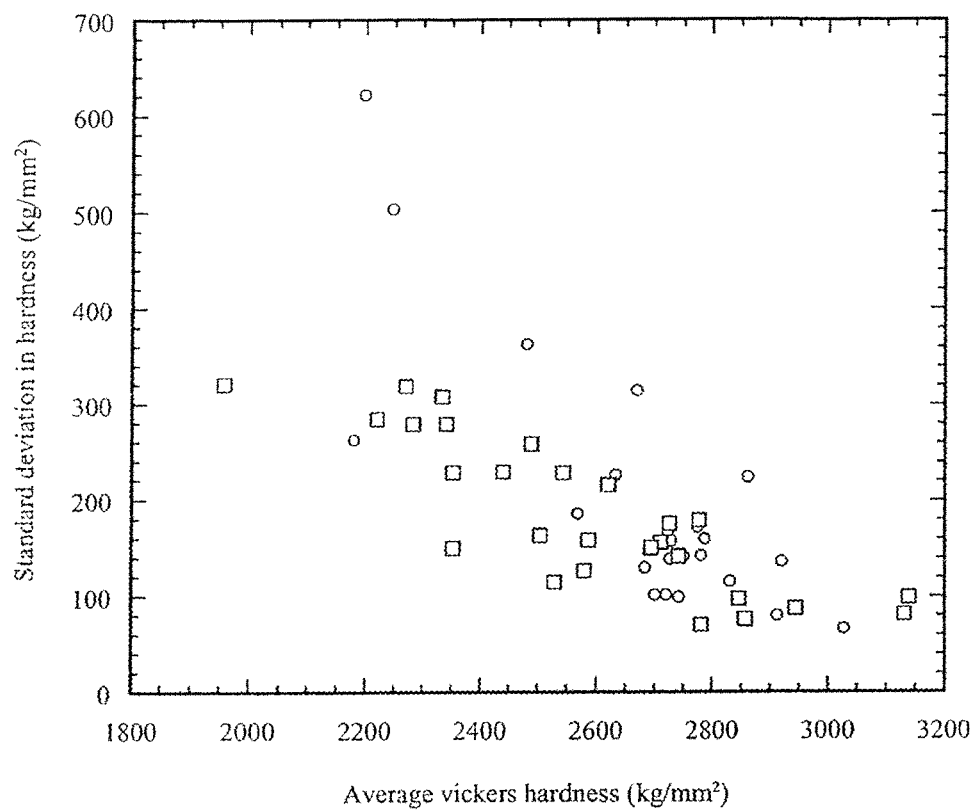
FIG. 31 graphically shows standard deviations in measured hardness values. Data represented by circles corresponds to Table 4, while data represented by squares corresponds to Table 5.

Heat treatments which resulted in lower hardness also resulted in greater deviations in measured hardness (FIG. 31). High hardness specimens tend to have low porosity, finely and homogeneously distributed second phases (graphite and $TiB_2$), and fine grain size. When this is not the case, the indenter will interact with varying microstructural features with every indent, increasing the standard deviation in measured hardnesses. Thus the development described herein which yields higher average hardnesses than previously recorded will also yield high consistency in hardness at all locations in the article, which is a great advantage when an article fabricated according to present invention is used in a high risk environment such as personal armor for intercepting ballistic projectiles.

The hardnesses of the 1.33 wt % Ti, 3.7 wt % C specimen exposed to a sintering soak temperature of 2200° C. along with that of the 2.40 wt % Ti, 1.2 wt % C specimen exposed to a sintering soak temperature of 2200° C. were remarkably high relative to available reported hardnesses of boron carbide. These specimens had a grain size very close to the starting particle size. Retaining the starting particle size in the post-HIPed grains represents the limit of the hardness which can be achieved. The particular powder used was prepared (jet-milled) so that it had a comparatively narrow particle size distribution; the $d_{90}$ to $d_{10}$ range for this powder was 1.5 to 0.2 µm. While imbuing a comparatively poor green density, such a distribution attenuated the driving force for grain growth. It is expected that if a narrow particle size distribution powder with a smaller $d_{50}$ were used, even higher hardnesses would be obtained.

The optimum additions of carbon and titanium using the methods described herein will vary with the powder source; the amount of carbon needed to facilitate sintering will likely need to be increased with increasing boron carbide particle size, and correspondingly the amount of added titanium will need to increase to consume much of this carbon to form hard, fine, well dispersed $TiB_2$ grains. Conversely, a boron carbide source with a higher concentration of free carbon (a common impurity), will require less carbon addition. The examples given herein demonstrate the methodology to establish the additive content and sintering soak temperatures needed to optimize hardness for differing sources of boron carbide, or lot numbers of the same grade and manufacturer of boron carbide.

The practical upper limit to organometallic Ti additions for the purpose of improving hardness is limited by other considerations: Thermolysis/pyrolysis heat treatments are typically performed slowly so as to not damage the part during the evolution of gases from the compact interior. This sensitivity generally increases with increasing article thickness. It has been found that additions of, for example, ~4 wt % Ti via the organometallic additive results in cracking of 4"×4" tiles of ~0.366" thickness, using the aforementioned thermolysis/pyrolysis schedule. It is possible that an even slower schedule may overcome this, but the time required for such schedules may become impractical. Further, continued additions of the organometallic additive will result in more $TiB_2$ (4.52 g/cm$^3$) relative to $B_4C$ (2.52 g/cm$^3$). For applications such as personal armor this added weight would be unwelcome. This also asserts an upper limit to desirable titanium additions.

As can be readily understood by a skilled person, with the proper selection of carbon content, pressureless sintering can take place at a lower temperature. The carbon can hinder grain growth while the proper selection of the titanium content can then attenuate the concentration of carbon in the final sintered product. Thus, the combination of the proper selection of carbon and titanium can allow for sintering at a low soak temperature at the threshold of closed porosity (i.e. at the minimum relative density required for HIPing to be effective) wherein grain sizes are maintained small and carbon is consumed through reaction with titanium, which will further increase the hardness of the material. That is, the carbon facilitates sintering, whose concentration is then attenuated in the process of forming very hard, finely dispersed $TiB_2$ phases. Also, by using a narrow particle size distribution $B_4C$ powder (as a starting source of boron carbide) and the use of sintering soak temperatures at the threshold of closed porosity, microstructures with average grain sizes approaching the original median particle size of the starting boron carbide powder can be attained. The combination of interdependent factors has led to $B_4C$-based articles of higher hardness than previously reported.

In short, the data reported herein indicates that by coating boron carbide particles with a titanium compound, a powder composition may be attained which, when pressureless sintered as set forth herein, can result in an article having a high hardness value. Coating the particles with a titanium compound and a carbon containing compound, and preparing an article based on a method according to the present invention can result in an article having a microstructure with fine grains (with a median grain size less than 100% larger than the median particle size of the boron carbide powder used for preparing the article) of $B_4C$ and $TiB_2$, and a diminished concentration of graphite, which translates into a hard article suitable for, for example, use in the construction of armor.

Comparative Study

To compare the effect of the water-soluble $C_6H_{10}O_8Ti.2(NH_4)$ (titanium compound) coating to providing titanium in the form of particulate $TiO_2$ additions, a separate series of experiments are described herein, undertaken by one of the named inventors and described in C. S. Wiley, Ph. D. Thesis, *Synergistic Methods for the Production of High Strength and Low Cost Boron Carbide*, Georgia Institute of Technology, Published December 2011, which is referred to in the background section. In these experiments, HD15 boron carbide powder (see Table 1 above for characteristics), $TiO_2$ powders (0.9 µm rutile $TiO_2$ or 32 nm anatase $TiO_2$) and organic binders were added to deionized water and homogenized to form a uniform slurry. Thus, in these studies, the slurry was not prepared with a water soluble titanium-containing organometallic compound. Rather, titanium oxide particles were used to prepare a slurry with boron carbide particles.

The slurries so prepared were then spray dried using an ultra-sonicating spray drier nozzle and a pilot plant scale spray dryer to obtain a powder composition containing a titanium source. Samples were then prepared from the powder composition in the same manner as that disclosed in FIG. 1A and related description. The amount of titanium used for the preparation of slurry samples were 0.5, 1, 3.0 and 5.0 wt %. Carbon additions to the various titanium-containing slurry sample was 0 wt %, 1.2 wt % and 3.7%.

Figures 19A, 19B, 19C:
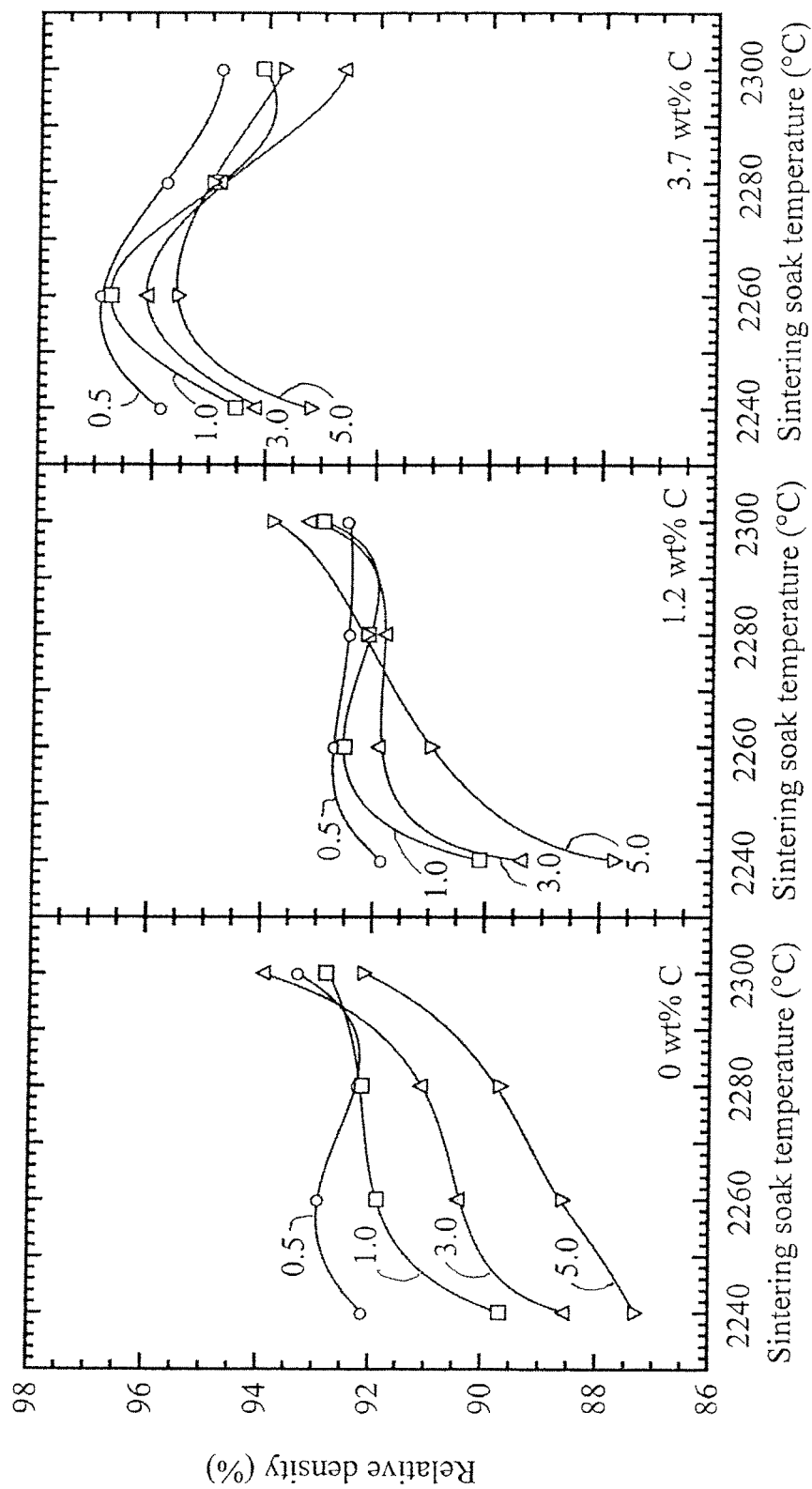
FIGS. 19A, 19B and 19C graphically show relative density values for samples prepared from a powder composition containing 0.5, 1.0, 3.0, 5.0 wt % Ti, and 0 (FIG. 19A), 1.2 (FIG. 19B) and 3.7 (FIG. 19C) wt % carbon, after sintering heat-treatment, as a function of sintering soak temperature, the titanium source being 0.9 μm $TiO_2$ particles.

FIGS. 19A-19C graphically disclose, as a function of pressureless sintering soaking temperature, the effect of using titania powder (0.9 µm $d_{50}$) in the slurries. FIGS. 20A-20C graphically disclose the results of HIPing on the same samples after pressureless sintering.

Figure 21:
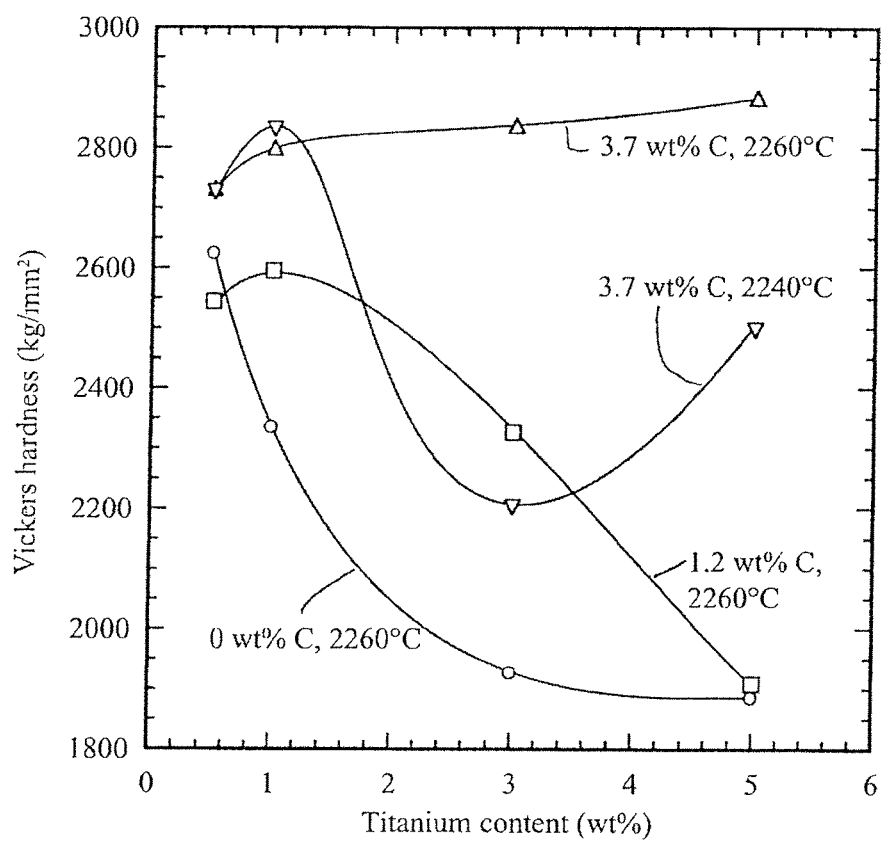
FIG. 21 graphically shows Vickers hardness values of selected samples from the samples of FIGS. 20A, 20B and 20C.
Figure 22:
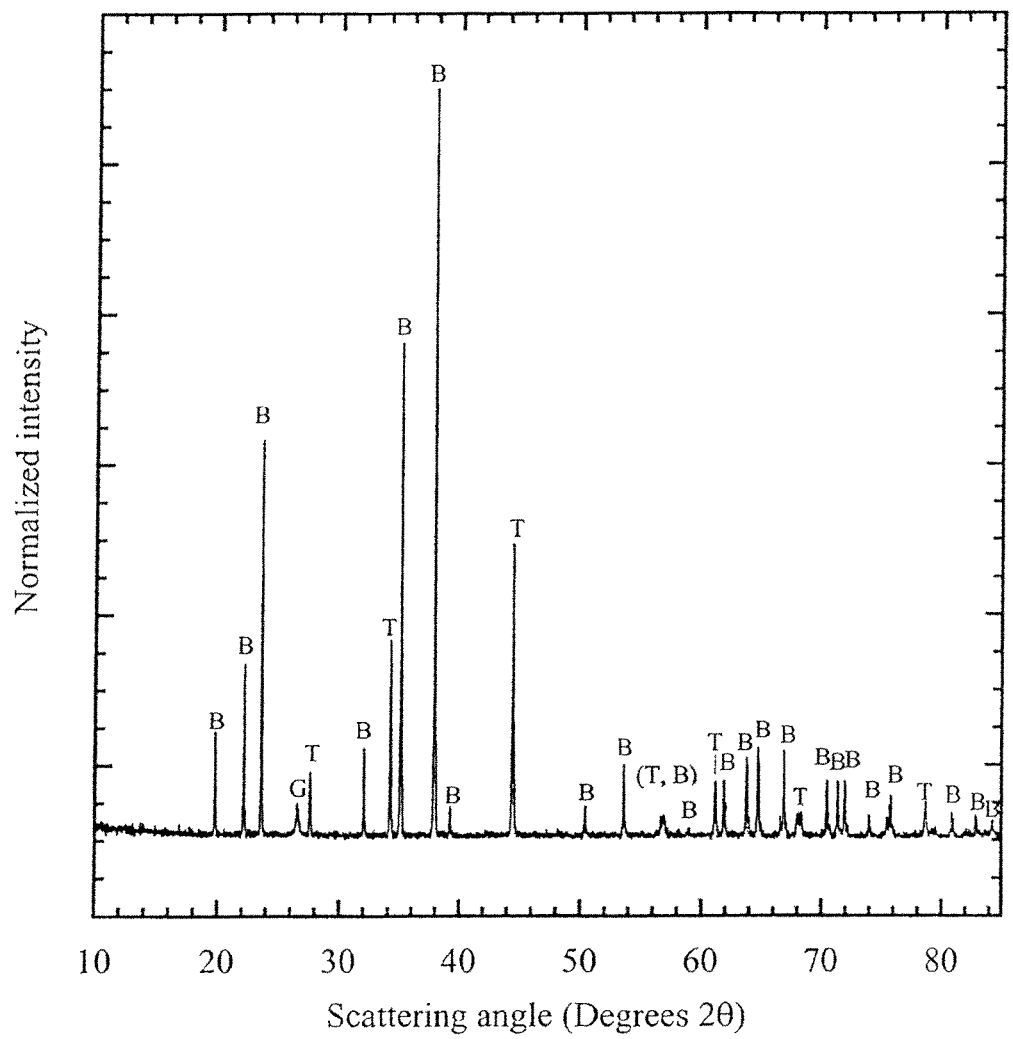
FIG. 22 shows an XRD pattern of a post-HIPed sample prepared from a powder composition containing 0.9 μm $TiO_2$ and phenolic resin additions, yielding 5 wt % Ti and 3.7 wt % C, exposed to a sintering soak temperature of 2260° C. B: $B_4C$, G: Graphite, T: $TiB_2$.
Figure 23A:
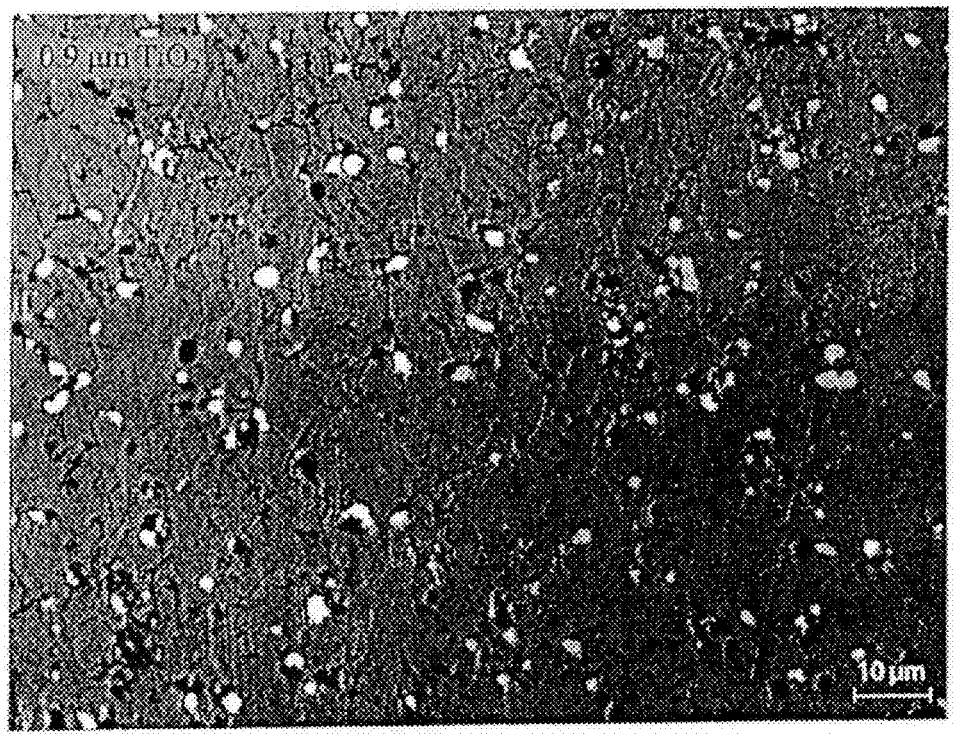
FIG. 23A shows an optical micrograph of a sample prepared from a powder composition prepared with 0.9 μm $TiO_2$ and phenolic resin additions, yielding 5 wt % Ti and 3.7 wt % C, exposed to a sintering soak temperature of 2260° C.

Referring to FIG. 21, highest post-HIPed relative densities were achieved using 2240° C. and 2260° C. pressureless sintering soak temperatures (~60° C. higher than high-hardness samples containing the liquid Ti additive), with a powder composition that contained titanium 1 wt % and 3.7 wt % carbon. As shown in FIG. 21, hardness was generally highest for this pressureless soak temperature and carbon content. Hardness increased only slightly with increasing Ti content but only for a soak temperature of 2260° C. The highest measured hardness, with 5 wt % Ti addition, was 2884.5 kg/mm$^2$. The phases in this post-HIPed specimen were the same as observed for $B_4C$ HD specimens disclosed herein of high hardness: $B_4C$, graphite, and $TiB_2$ (FIG. 22). The microstructure of this sample is shown in FIG. 23A. As compared to the microstructure of the specimen using the organometallic additive with the highest hardness (FIG. 15B), this microstructure shows larger grains of $B_4C$, C, and $TiB_2$, as well as a more heterogeneous distribution of second phases (C and $TiB_2$). Note that the grain sizes are in the order of 10 um, which is much larger than the grain sizes in some of the samples prepared according to the present invention.

Figure 23B:
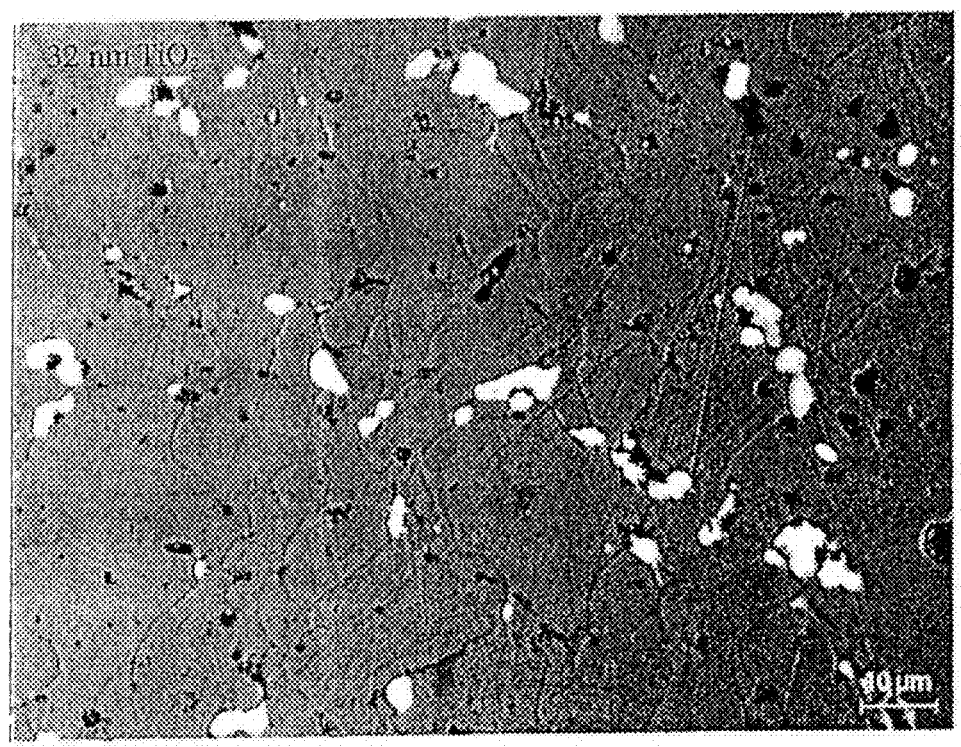
FIG. 23B shows an optical micrograph of the sample prepared with the same chemical composition as in FIG. 23A in which the titanium source was 32 nm $TiO_2$ particles.
Figures 24A, 24B, 24C:
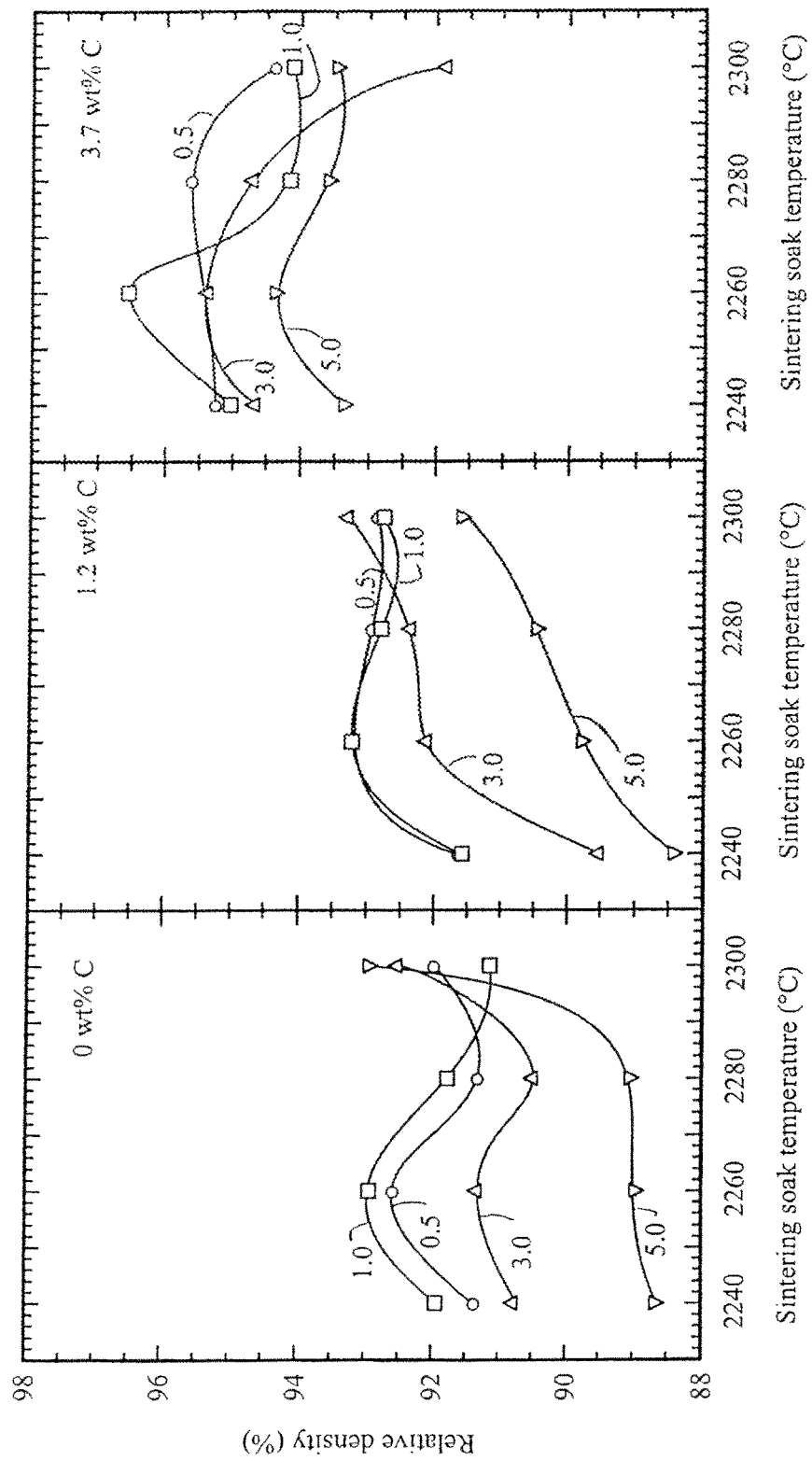
FIGS. 24A, 24B and 24C graphically show relative density values for samples prepared from a powder composition containing 0.5, 1.0, 3.0, 5.0 wt % Ti, and 0 (FIG. 24A), 1.2 (FIG. 24B) and 3.7 (FIG. 24C) wt % carbon, after sintering heat-treatment, as a function of sintering soak temperature, the titanium source being 32 nm $TiO_2$.
Figures 25A, 25B, 25C:
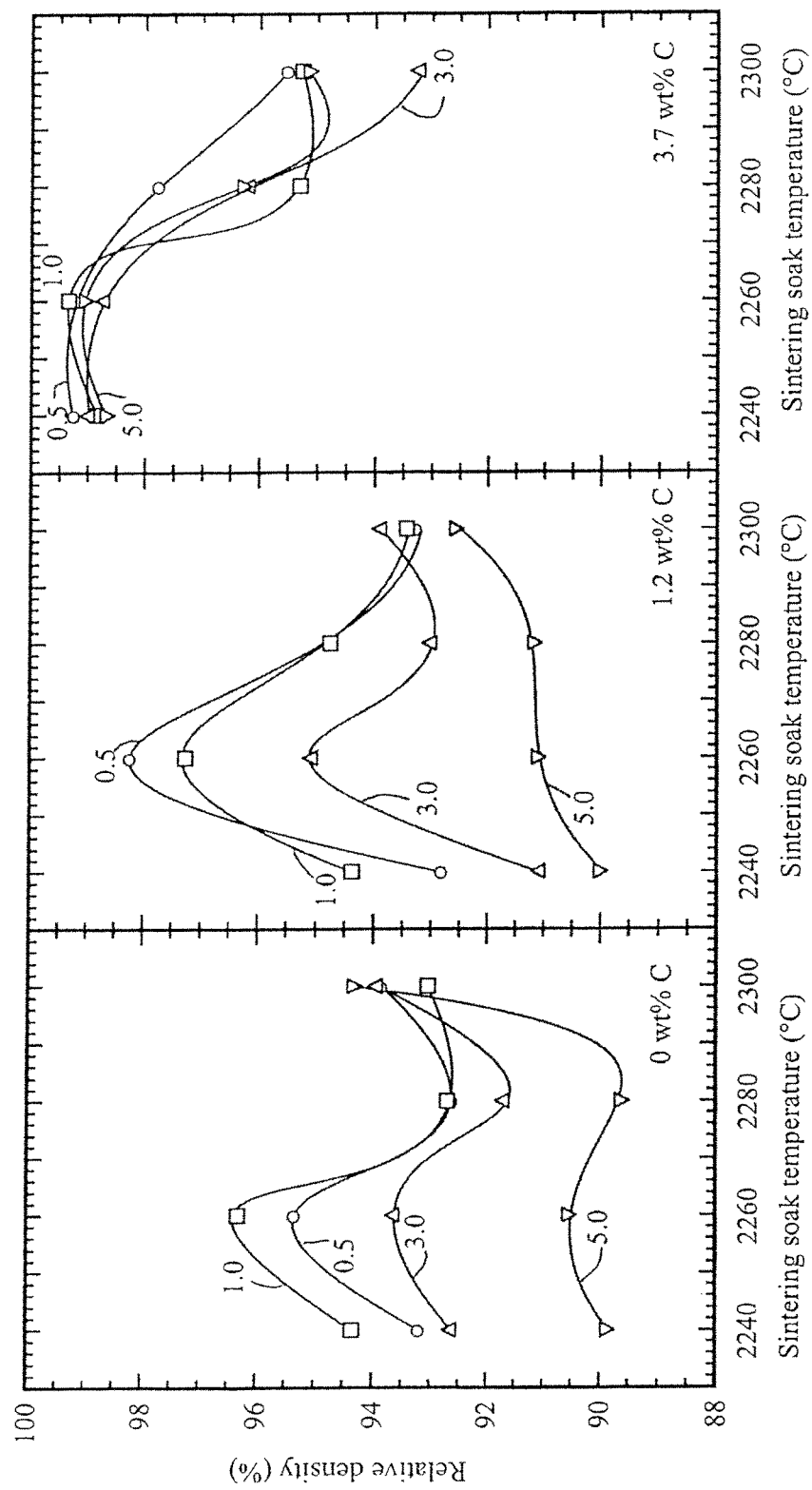
FIGS. 25A, 25B and 25C graphically show relative density values for the samples in FIGS. 24A, 24B and 24C respectively after HIPing, as a function of sintering soak temperature. Labels in the figure correspond to Ti weight percent.
Figure 26:
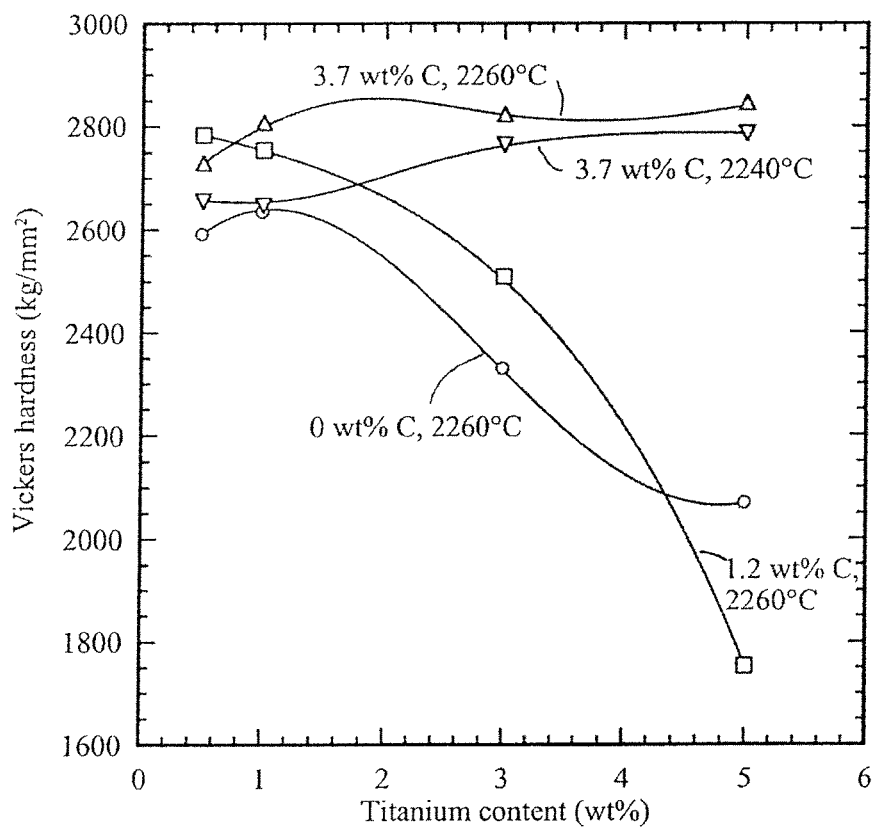
FIG. 26 graphically show Vickers hardness values of selected post-HIPed samples of FIGS. 25A, 25B and 25C pressureless sintered at 2240° C. and 2260° C., as a function of Ti content (32 nm $TiO_2$).

FIGS. 24A-24C and FIGS. 25A-25C show the sintered and post-HIPed relative densities for a sample prepared in same manner as this comparative study except with 32 nm $TiO_2$ additions to the slurry. Referring to FIG. 26, a sintering soak temperature of 2260° C. for a sample prepared from a powder composition containing more than 1 wt % of titanium and 3.7 wt % carbon additions facilitated the highest post-HIPed relative densities. The hardness achieved after post-HIPing a sample prepared from a powder containing 5 wt % Ti, 3.7 wt % C, and a pressureless sintered at a soak temperature of 2260° C. was 2846.0 kg/mm$^2$ (FIG. 26). The lack of improvement in highest achievable hardness with nano-scale particle addition of TiO$_2$ is likely attributable to the high agglomeration tendency of such fine particles. As shown in FIG. 23B, the TiB$_2$ grains in the microstructure were in fact coarsened as compared to the case in which TiO$_2$ was added as 0.9 μm d$_{50}$ particles. The best hardness values for the samples prepared based powder compositions containing the two TiO$_2$ particle sizes were well below the hardness achieved with the C$_6$H$_{10}$O$_8$Ti.2(NH$_4$) additive (3137.6 kg/mm$^2$) used in the examples disclosed above. Thus, the comparative examples indicate that higher hardness values may be achieved when using a titanium organometallic as a titanium source in the slurry is used for the preparation of the powder composition used for the green bodies.

What is claimed is:

1. A solid article formed from a boron carbide powder that includes boron carbide particles having a median particle size, the solid article comprising:
 a sintered body that includes a boron carbide phase and a titanium diboride phase, the phases being present in granular form, wherein the relative density of the sintered body is more than 99% and the hardness of the sintered body is more than 2600 Vickers, and the median grain sizes of the grains of each phase is no more than 100% larger than the median particle size of the boron carbide particles in the starting powder.

2. The solid article of claim 1, wherein said sintered body further includes a carbon-based phase, wherein said carbon-based phase is 0-0.5% of the volume of said sintered body.

3. The solid article of claim 1, wherein said sintered body includes 0.081-5 wt % titanium in the form of TiB2.

4. The solid article of claim 1, wherein up to 50% of grains of said phases are less 1 μm in diameter.

5. The solid article of claim 1, wherein up to 40% of grains of said phases are less than 0.5 μm in diameter.

* * * * *